United States Patent
Soto et al.

(10) Patent No.: US 11,641,247 B2
(45) Date of Patent: May 2, 2023

(54) SYSTEM AND METHOD FOR PERFORMING HIGH-SPEED COMMUNICATIONS OVER FIBER OPTICAL NETWORKS

(71) Applicants: Alexander Soto, Las Vegas, NV (US); Walter Soto, Las Vegas, NV (US)

(72) Inventors: Alexander Soto, Las Vegas, NV (US); Walter Soto, Las Vegas, NV (US)

(*) Notice: Subject to any disclaimer, the term of this patent is extended or adjusted under 35 U.S.C. 154(b) by 0 days.

(21) Appl. No.: 17/897,115

(22) Filed: Aug. 26, 2022

(65) Prior Publication Data
US 2023/0006757 A1 Jan. 5, 2023

Related U.S. Application Data

(63) Continuation of application No. 17/013,635, filed on Sep. 6, 2020, now Pat. No. 11,431,432, which is a
(Continued)

(51) Int. Cl.
*H04B 10/00* (2013.01)
*H04J 14/02* (2006.01)
(Continued)

(52) U.S. Cl.
CPC ...... *H04J 14/0221* (2013.01); *H04B 10/2507* (2013.01); *H04B 10/2581* (2013.01);
(Continued)

(58) Field of Classification Search
CPC combination set(s) only.
See application file for complete search history.

(56) References Cited

U.S. PATENT DOCUMENTS

| 5,388,088 A | 2/1995 | Gans et al. |
| 5,424,863 A | 6/1995 | Gertel |

(Continued)

FOREIGN PATENT DOCUMENTS

| CN | 2552022 | 5/2003 |
| CN | 101185247 | 5/2008 |

(Continued)

OTHER PUBLICATIONS

"Defendants AT&T Services, Inc.'S and AT&T Corp.'S Answer To Plaintiff Nextgen Innovations, LLC'S Complaint," *NextGen Innovations, Inc v. AT&T Services, Inc and AT&T Corp.*, Case No. 2:22-cv-00308-JRG-RSP, 24 pp. (Oct. 18, 2022).
(Continued)

*Primary Examiner* — Agustin Bello

(57) ABSTRACT

Processing a received optical signal in an optical communication network includes equalizing a received optical signal to provide an equalized signal, demodulating the equalized signal according to an m-ary modulation format to provide a demodulated signal, decoding the demodulated signal according to an inner code to provide an inner-decoded signal, and decoding the inner-decoded signal according to an outer code. Other aspects include other features such as equalizing an optical channel including storing channel characteristics for the optical channel associated with a client, loading the stored channel characteristics during a waiting period between bursts on the channel, and equalizing a received burst from the client using the loaded channel characteristics.

20 Claims, 15 Drawing Sheets

Related U.S. Application Data continuation of application No. 16/297,610, filed on Mar. 9, 2019, now Pat. No. 10,771,181, which is a continuation of application No. 15/884,351, filed on Jan. 30, 2018, now Pat. No. 10,263,723, which is a continuation of application No. 15/095,137, filed on Apr. 10, 2016, now Pat. No. 9,887,795, which is a continuation of application No. 12/512,968, filed on Jul. 30, 2009, now Pat. No. 9,337,948, which is a continuation-in-part of application No. 11/772,187, filed on Jun. 30, 2007, now abandoned, which is a continuation of application No. 10/865,547, filed on Jun. 10, 2004, now Pat. No. 7,242,868.

(60) Provisional application No. 60/480,488, filed on Jun. 21, 2003, provisional application No. 60/477,845, filed on Jun. 10, 2003.

(51) Int. Cl.
 *H04B 10/40* (2013.01)
 *H04B 10/2507* (2013.01)
 *H04B 10/2581* (2013.01)
 *H04B 10/516* (2013.01)

(52) U.S. Cl.
 CPC ......... *H04B 10/40* (2013.01); *H04B 10/5161* (2013.01); *H04J 14/02* (2013.01); *H04J 14/0256* (2013.01); *H04J 14/0267* (2013.01); *H04J 14/0282* (2013.01); *H04J 14/0298* (2013.01); *H04J 14/0227* (2013.01)

(56) References Cited

U.S. PATENT DOCUMENTS

| | | | |
|---|---|---|---|
| 5,734,558 A | 3/1998 | Poplawski et al. | |
| 5,835,731 A | 11/1998 | Werner et al. | |
| 5,879,173 A | 3/1999 | Poplawski et al. | |
| 5,880,864 A | 3/1999 | Williams et al. | |
| 5,917,634 A | 6/1999 | Otobe | |
| 5,960,040 A | 9/1999 | Cai et al. | |
| 6,005,694 A | 12/1999 | Liu | |
| 6,075,628 A | 6/2000 | Fisher et al. | |
| 6,295,272 B1 | 9/2001 | Feldman et al. | |
| 6,434,015 B1 | 8/2002 | Hwang | |
| 6,494,623 B1 | 12/2002 | Ahrens et al. | |
| 6,519,255 B1 | 2/2003 | Graves | |
| 6,529,303 B1 | 3/2003 | Rowan et al. | |
| 6,533,470 B2 | 3/2003 | Ahrens et al. | |
| 6,546,014 B1 | 4/2003 | Kramer et al. | |
| 6,580,531 B1 | 6/2003 | Swanson et al. | |
| 6,580,535 B1 | 6/2003 | Schonfelder | |
| 6,603,822 B2* | 8/2003 | Brede | H04L 5/143 398/99 |
| 6,665,498 B1 | 12/2003 | Jiang et al. | |
| 6,762,940 B2 | 7/2004 | Zaremba | |
| 6,819,568 B2 | 11/2004 | Cao | |
| 6,856,184 B2 | 2/2005 | Hidai | |
| 6,866,544 B1 | 3/2005 | Casey et al. | |
| 6,873,800 B1 | 3/2005 | Wei et al. | |
| 6,879,640 B1 | 4/2005 | Agazzi et al. | |
| 6,935,882 B2 | 8/2005 | Hanley et al. | |
| 6,973,271 B2 | 12/2005 | Farmer et al. | |
| 6,975,642 B2 | 12/2005 | Levinson et al. | |
| 6,999,323 B1 | 2/2006 | Aronson et al. | |
| 7,079,775 B2 | 2/2006 | Aronson et al. | |
| 7,103,279 B1 | 9/2006 | Koh et al. | |
| 7,155,134 B2 | 12/2006 | Azadet | |
| 7,181,142 B1 | 2/2007 | Xu et al. | |
| 7,206,366 B2 | 4/2007 | Fujimori et al. | |
| 7,215,891 B1 | 5/2007 | Chiang et al. | |
| 7,228,077 B2 | 6/2007 | Newell et al. | |
| 7,242,868 B2* | 7/2007 | Soto | H04L 25/4917 398/208 |
| 7,286,762 B2 | 10/2007 | Elahmadi et al. | |
| 7,292,547 B1 | 11/2007 | Godwin et al. | |
| 7,317,769 B2* | 1/2008 | Tonietto | G11B 20/10222 398/155 |
| 7,321,612 B2* | 1/2008 | Tonietto | G11B 20/10027 398/155 |
| 7,325,983 B1 | 2/2008 | Dallesasse et al. | |
| 7,373,087 B2 | 5/2008 | Shi et al. | |
| 7,380,993 B2 | 6/2008 | Dallesasse | |
| 7,388,904 B2 | 6/2008 | Raghavan et al. | |
| 7,486,894 B2* | 2/2009 | Aronson | H04L 25/242 398/154 |
| 7,515,832 B2 | 4/2009 | Kikuchi | |
| 7,580,637 B2 | 8/2009 | El-Ahmadi et al. | |
| 7,596,801 B2 | 9/2009 | Wall et al. | |
| 7,693,178 B2 | 4/2010 | Wojtowicz | |
| 7,715,669 B2 | 5/2010 | Cunningham et al. | |
| 7,729,617 B2* | 6/2010 | Sheth | H04B 10/801 370/545 |
| RE41,517 E | 8/2010 | Possley et al. | |
| 7,809,275 B2 | 10/2010 | Aronson et al. | |
| 7,826,752 B1 | 11/2010 | Zanoni et al. | |
| 7,852,913 B2 | 12/2010 | Agazzi et al. | |
| 7,933,341 B2 | 4/2011 | Agazzi et al. | |
| 7,983,349 B2 | 7/2011 | Kennedy et al. | |
| 8,107,820 B2 | 1/2012 | Hotchkiss et al. | |
| 8,145,980 B2 | 3/2012 | Eroz et al. | |
| 8,265,134 B2 | 9/2012 | Agazzi et al. | |
| 8,315,387 B2 | 11/2012 | Kanter et al. | |
| 8,356,190 B2 | 1/2013 | Diab | |
| 8,422,591 B2 | 4/2013 | Agazzi et al. | |
| 8,433,202 B2 | 4/2013 | Way | |
| 8,473,640 B2 | 6/2013 | Fujimori et al. | |
| 8,478,128 B2 | 7/2013 | Aronson et al. | |
| 8,661,313 B2 | 2/2014 | Ganga et al. | |
| 9,136,942 B2 | 9/2015 | Lindsay et al. | |
| 9,191,117 B2 | 11/2015 | Alexander et al. | |
| 9,337,948 B2* | 5/2016 | Soto | H04B 10/2507 |
| 2001/0035994 A1 | 11/2001 | Agazzi et al. | |
| 2001/0035997 A1 | 11/2001 | Agazzi | |
| 2002/0027688 A1 | 3/2002 | Stephenson | |
| 2002/0039211 A1 | 4/2002 | Shen et al. | |
| 2002/0063932 A1 | 5/2002 | Unitt et al. | |
| 2002/0131730 A1 | 9/2002 | Keeble et al. | |
| 2002/0136232 A1 | 9/2002 | Dudziak et al. | |
| 2002/0149821 A1* | 10/2002 | Aronson | G01M 11/30 385/14 |
| 2002/0167693 A1 | 11/2002 | Vrazel et al. | |
| 2002/0181052 A1 | 12/2002 | Butman et al. | |
| 2002/0181063 A1 | 12/2002 | Kropp | |
| 2002/0181894 A1* | 12/2002 | Gilliland | G02B 6/4246 385/88 |
| 2002/0181895 A1* | 12/2002 | Gilliland | G02B 6/4246 385/88 |
| 2003/0020986 A1 | 1/2003 | Pang et al. | |
| 2003/0030873 A1 | 2/2003 | Hietala et al. | |
| 2003/0053170 A1 | 3/2003 | Levinson et al. | |
| 2003/0067659 A1 | 4/2003 | Kusiolek | |
| 2003/0072050 A1 | 4/2003 | Vrazel et al. | |
| 2003/0091111 A1 | 5/2003 | Vaananen | |
| 2003/0112896 A1 | 6/2003 | Raghavan et al. | |
| 2003/0118273 A1* | 6/2003 | Richard | G02B 6/29362 385/16 |
| 2003/0214789 A1 | 11/2003 | Medina et al. | |
| 2003/0223762 A1 | 12/2003 | Ho | |
| 2003/0231676 A1 | 12/2003 | Buckman et al. | |
| 2004/0028408 A1* | 2/2004 | Cox | H04L 12/4625 398/66 |
| 2004/0033079 A1 | 2/2004 | Sheth et al. | |
| 2004/0052528 A1 | 3/2004 | Halgren et al. | |
| 2004/0161240 A1 | 8/2004 | Weber | |
| 2004/0179562 A1 | 9/2004 | Carroll et al. | |
| 2004/0196404 A1 | 10/2004 | Loheit et al. | |
| 2004/0208232 A1 | 10/2004 | Sudo | |
| 2004/0208601 A1 | 10/2004 | Tan et al. | |
| 2005/0069327 A1 | 3/2005 | Franck et al. | |
| 2005/0105901 A1 | 5/2005 | Favor et al. | |
| 2005/0191059 A1 | 9/2005 | Swenson et al. | |

(56) References Cited

U.S. PATENT DOCUMENTS

| | | | |
|---|---|---|---|
| 2005/0232643 A1 | 10/2005 | Aronson et al. | |
| 2007/0031153 A1* | 2/2007 | Aronson | H04L 25/242 398/138 |
| 2008/0050074 A1 | 2/2008 | Dallesasse et al. | |
| 2008/0095541 A1 | 4/2008 | Dallesasse | |
| 2008/0240325 A1 | 10/2008 | Agazzi et al. | |
| 2009/0269076 A1 | 10/2009 | Cai et al. | |
| 2010/0021166 A1 | 1/2010 | Way | |
| 2010/0158530 A1* | 6/2010 | Soto | H04J 14/0282 398/79 |
| 2010/0202781 A1 | 8/2010 | Hudgins et al. | |
| 2011/0135312 A1* | 6/2011 | El-Ahmadi | H04J 3/1658 714/752 |

FOREIGN PATENT DOCUMENTS

| | | |
|---|---|---|
| EP | 1241811 A2 | 9/2002 |
| JP | 1141301 | 2/1999 |
| JP | 2001339418 | 12/2001 |
| JP | 2002152142 | 5/2002 |
| JP | 2002300180 | 10/2002 |
| JP | 2004529523 | 9/2004 |
| KR | 100824146 | 4/2008 |
| WO | 2000042727 A1 | 1/2000 |
| WO | 2002027994 A1 | 4/2002 |
| WO | 2002045308 A1 | 6/2002 |
| WO | 2003007564 A2 | 1/2003 |
| WO | 2003075064 A2 | 9/2003 |
| WO | 2005070177 A2 | 8/2005 |
| WO | 2007077451 A1 | 7/2007 |

OTHER PUBLICATIONS

"Defendant Fujitsu Network Communications, Inc.'S Answer and Counterclaims To Nextgen Innovations, LLC'S Complaint for Patent Infringement," *NextGen Innovations, Inc v. Fujitsu Network Communications, Inc.*, Fujitsu Limited, Fujitsu America, Inc., Fujitsu Optical Components Limited, and Fujitsu Optical Components America, Inc., Case No. 2:22-cv-00307-JRG-RSP, 44 pp. (Dec. 8, 2022).

'Defendants' Appendix C-38—Invalidity claim chart for '795 in view of Howland, *NextGen Innovations, LLC v. Fujitsu Network Communications, Inc*, Case No. 2:22-cv-00307-JRG-RSP, 65 pp. (Feb. 2, 2023).

'Defendants' Appendix C-39—Invalidity claim chart for '795 in view of XFP Specification, *NextGen Innovations, LLC v. Fujitsu Network Communications, Inc*, Case No. 2:22-cv-00307-JRG-RSP, 76 pp. (Feb. 2, 2023).

'Defendants' Appendix C-40—Invalidity claim chart for '795 in view of SFP MSA, *NextGen Innovations, LLC v. Fujitsu Network Communications, Inc*, Case No. 2:22-cv-00307-JRG-RSP, 28 pp. (Feb. 2, 2023).

'Defendants' Appendix C-41—Invalidity claim chart for '795 in view of 1000Base-T, *NextGen Innovations, LLC v. Fujitsu Network Communications, Inc*, Case No. 2:22-cv-00307-JRG-RSP, 25 pp. (Feb. 2, 2023).

'Defendants' Appendix C-42—Invalidity claim chart for '795 in view of Cardenas, *NextGen Innovations, LLC v. Fujitsu Network Communications, Inc*, Case No. 2:22-cv-00307-JRG-RSP, 27 pp. (Feb. 2, 2023).

'Defendants' Appendix C-43—Invalidity claim chart for '795 in view of Zhou, *NextGen Innovations, LLC v. Fujitsu Network Communications, Inc*, Case No. 2:22-cv-00307-JRG-RSP, 28 pp. (Feb. 2, 2023).

'Defendants' Appendix C-44—Invalidity claim chart for '795 in view of Berthold, *NextGen Innovations, LLC v. Fujitsu Network Communications, Inc*, Case No. 2:22-cv-00307-JRG-RSP, 31 pp. (Feb. 2, 2023).

'Defendants' Appendix C-45—Invalidity claim chart for '795 in view of Carroll, *NextGen Innovations, LLC v. Fujitsu Network Communications, Inc*, Case No. 2:22-cv-00307-JRG-RSP, 55 pp. (Feb. 2, 2023).

'Defendants' Appendix C-46—Invalidity claim chart for '795 in view of Casey, *NextGen Innovations, LLC v. Fujitsu Network Communications, Inc*, Case No. 2:22-cv-00307-JRG-RSP, 35 pp. (Feb. 2, 2023).

'Defendants' Appendix C-47—Invalidity claim chart for '795 in view of Fujimori, *NextGen Innovations, LLC v. Fujitsu Network Communications, Inc*, Case No. 2:22-cv-00307-JRG-RSP, 73 pp. (Feb. 2, 2023).

'Defendants' Appendix C-48—Invalidity claim chart for '795 in view of Gertel, *NextGen Innovations, LLC v. Fujitsu Network Communications, Inc*, Case No. 2:22-cv-00307-JRG-RSP, 65 pp. (Feb. 2, 2023).

'Defendants' Appendix C-49—Invalidity claim chart for '795 in view of Hietala, *NextGen Innovations, LLC v. Fujitsu Network Communications, Inc*, Case No. 2:22-cv-00307-JRG-RSP, 69 pp. (Feb. 2, 2023).

'Defendants' Appendix C-50—Invalidity claim chart for '795 in view of Koh, *NextGen Innovations, LLC v. Fujitsu Network Communications, Inc*, Case No. 2:22-cv-00307-JRG-RSP, 76 pp. (Feb. 2, 2023).

'Defendants' Appendix C-51—Invalidity claim chart for '795 in view of Nobuyuki, *NextGen Innovations, LLC v. Fujitsu Network Communications, Inc*, Case No. 2:22-cv-00307-JRG-RSP, 56 pp. (Feb. 2, 2023).

'Defendants' Appendix C-52—Invalidity claim chart for '795 in view of Otobe, *NextGen Innovations, LLC v. Fujitsu Network Communications, Inc*, Case No. 2:22-cv-00307-JRG-RSP, 63 pp. (Feb. 2, 2023).

'Defendants' Appendix C-53—Invalidity claim chart for '795 in view of Poplawski '558, *NextGen Innovations, LLC v. Fujitsu Network Communications, Inc*, Case No. 2:22-cv-00307-JRG-RSP, 60 pp. (Feb. 2, 2023).

'Defendants' Appendix C-54—Invalidity claim chart for '795 in view of Raghavan '904, *NextGen Innovations, LLC v. Fujitsu Network Communications, Inc*, Case No. 2:22-cv-00307-JRG-RSP, 77 pp. (Feb. 2, 2023).

'Defendants' Appendix C-55—Invalidity claim chart for '795 in view of Rowan, *NextGen Innovations, LLC v. Fujitsu Network Communications, Inc*, Case No. 2:22-cv-00307-JRG-RSP, 68 pp. (Feb. 2, 2023).

'Defendants' Appendix C-56—Invalidity claim chart for '795 in view of Shinobu, *NextGen Innovations, LLC v. Fujitsu Network Communications, Inc*, Case No. 2:22-cv-00307-JRG-RSP, 77 pp. (Feb. 2, 2023).

'Defendants' Appendix C-57—Invalidity claim chart for '795 in view of Unitt, *NextGen Innovations, LLC v. Fujitsu Network Communications, Inc*, Case No. 2:22-cv-00307-JRG-RSP, 43 pp. (Feb. 2, 2023).

'Defendants' Appendix C-58—Invalidity claim chart for '795 in view of Wei, *NextGen Innovations, LLC v. Fujitsu Network Communications, Inc*, Case No. 2:22-cv-00307-JRG-RSP, 58 pp. (Feb. 2, 2023).

'Defendants' Appendix C-59—Invalidity claim chart for '795 in view of Graves, *NextGen Innovations, LLC v. Fujitsu Network Communications, Inc*, Case No. 2:22-cv-00307-JRG-RSP, 66 pp. (Feb. 2, 2023).

'Defendants' Appendix C-60—Invalidity claim chart for '795 in view of Levinson, *NextGen Innovations, LLC v. Fujitsu Network Communications, Inc*, Case No. 2:22-cv-00307-JRG-RSP, 47 pp. (Feb. 2, 2023).

'Defendants' Appendix C-61—Invalidity claim chart for '795 in view of Weber, *NextGen Innovations, LLC v. Fujitsu Network Communications, Inc*, Case No. 2:22-cv-00307-JRG-RSP, 55 pp. (Feb. 2, 2023).

'Defendants' Appendix C-62—Invalidity claim chart for '795 in view of Shi, *NextGen Innovations, LLC v. Fujitsu Network Communications, Inc*, Case No. 2:22-cv-00307-JRG-RSP, 37 pp. (Feb. 2, 2023).

(56) References Cited

OTHER PUBLICATIONS

'Defendants' Appendix C-63—Invalidity claim chart for '795 in view of Richard, *NextGen Innovations, LLC v. Fujitsu Network Communications, Inc*, Case No. 2:22-cv-00307-JRG-RSP, 31 pp. (Feb. 2, 2023).
'Defendants' Appendix C-64—Invalidity claim chart for '795 in view of Xu, *NextGen Innovations, LLC v. Fujitsu Network Communications, Inc*, Case No. 2:22-cv-00307-JRG-RSP, 25 pp. (Feb. 2, 2023).
'Defendants' Appendix C-65—Invalidity claim chart for '795 in view of Swenson, *NextGen Innovations, LLC v. Fujitsu Network Communications, Inc*, Case No. 2:22-cv-00307-JRG-RSP, 33 pp. (Feb. 2, 2023).
'Defendants' Appendix C-66—Invalidity claim chart for '795 in view of Cai, *NextGen Innovations, LLC v. Fujitsu Network Communications, Inc*, Case No. 2:22-cv-00307-JRG-RSP, 27 pp. (Feb. 2, 2023).
'Defendants' Appendix C-67—Invalidity claim chart for '795 in view of Liu, *NextGen Innovations, LLC v. Fujitsu Network Communications, Inc*, Case No. 2:22-cv-00307-JRG-RSP, 20 pp. (Feb. 2, 2023).
'Defendants' Appendix C-68—Invalidity claim chart for '795 in view of Djordjevic, *NextGen Innovations, LLC v. Fujitsu Network Communications, Inc*, Case No. 2:22-cv-00307-JRG-RSP, 21 pp. (Feb. 2, 2023).
'Defendants' Appendix C-69—Invalidity claim chart for '795 in view of Gans, *NextGen Innovations, LLC v. Fujitsu Network Communications, Inc*, Case No. 2:22-cv-00307-JRG-RSP, 26 pp. (Feb. 2, 2023).
'Defendants' Appendix C-70—Invalidity claim chart for '795 in view of Zanoni, *NextGen Innovations, LLC v. Fujitsu Network Communications, Inc*, Case No. 2:22-cv-00307-JRG-RSP, 41 pp. (Feb. 2, 2023).
'Defendants' Appendix C-71—Invalidity claim chart for '795 in view of Hudgins, *NextGen Innovations, LLC v. Fujitsu Network Communications, Inc*, Case No. 2:22-cv-00307-JRG-RSP, 41 pp. (Feb. 2, 2023).
'Defendants' Subject Matter Eligibility Contentions, *NextGen Innovations, LLC v. Fujitsu Network Communications, Inc*, Case No. 2:22-cv-00307-JRG-RSP, 10 pp. (Feb. 2, 2023).
'Defendants' Appendix A-101—Subject Matter Eligibility Contentions for '181, *NextGen Innovations, LLC v. Fujitsu Network Communications, Inc*, Case No. 2:22-cv-00307-JRG-RSP, 33 pp. (Feb. 2, 2023).
'Defendants' Appendix B-101—Subject Matter Eligibility Contentions for '723, *NextGen Innovations, LLC v. Fujitsu Network Communications, Inc*, Case No. 2:22-cv-00307-JRG-RSP, 29 pp. (Feb. 2, 2023).
'Defendants' Appendix C-101—Subject Matter Eligibility Contentions for '795, *NextGen Innovations, LLC v. Fujitsu Network Communications, Inc*, Case No. 2:22-cv-00307-JRG-RSP, 23 pp. (Feb. 2, 2023).
'Defendants' Appendix B-09—Invalidity claim chart for '723 in view of Jiang, *NextGen Innovations, LLC v. Fujitsu Network Communications, Inc*, Case No. 2:22-cv-00307-JRG-RSP, 154 pp. (Feb. 2, 2023).
'Defendants' Appendix B-10—Invalidity claim chart for '723 in view of Kusiolek, *NextGen Innovations, LLC v. Fujitsu Network Communications, Inc*, Case No. 2:22-cv-00307-JRG-RSP, 52 pp. (Feb. 2, 2023).
'Defendants' Appendix B-11—Invalidity claim chart for '723 in view of Marcionetti, *NextGen Innovations, LLC v. Fujitsu Network Communications, Inc*, Case No. 2:22-cv-00307-JRG-RSP, 151 pp. (Feb. 2, 2023).
'Defendants' Appendix B-12—Invalidity claim chart for '723 in view of Medina, *NextGen Innovations, LLC v. Fujitsu Network Communications, Inc*, Case No. 2:22-cv-00307-JRG-RSP, 29 pp. (Feb. 2, 2023).
'Defendants' Appendix B-13—Invalidity claim chart for '723 in view of Nanzong, *NextGen Innovations, LLC v. Fujitsu Network Communications, Inc*, Case No. 2:22-cv-00307-JRG-RSP, 38 pp. (Feb. 2, 2023).
'Defendants' Appendix B-14—Invalidity claim chart for '723 in view of Newell, *NextGen Innovations, LLC v. Fujitsu Network Communications, Inc*, Case No. 2:22-cv-00307-JRG-RSP, 48 pp. (Feb. 2, 2023).
'Defendants' Appendix B-15—Invalidity claim chart for '723 in view of Pang, *NextGen Innovations, LLC v. Fujitsu Network Communications, Inc*, Case No. 2:22-cv-00307-JRG-RSP, 64 pp. (Feb. 2, 2023).
'Defendants' Appendix B-16—Invalidity claim chart for '723 in view of Poplawski, *NextGen Innovations, LLC v. Fujitsu Network Communications, Inc*, Case No. 2:22-cv-00307-JRG-RSP, 34 pp. (Feb. 2, 2023).
'Defendants' Appendix B-17—Invalidity claim chart for '723 in view of Raghavan, *NextGen Innovations, LLC v. Fujitsu Network Communications, Inc*, Case No. 2:22-cv-00307-JRG-RSP, 51 pp. (Feb. 2, 2023).
'Defendants' Appendix B-18—Invalidity claim chart for '723 in view of Stephenson, *NextGen Innovations, LLC v. Fujitsu Network Communications, Inc*, Case No. 2:22-cv-00307-JRG-RSP, 84 pp. (Feb. 2, 2023).
'Defendants' Appendix B-19—Invalidity claim chart for '723 in view of Tan, *NextGen Innovations, LLC v. Fujitsu Network Communications, Inc*, Case No. 2:22-cv-00307-JRG-RSP, 58 pp. (Feb. 2, 2023).
'Defendants' Appendix B-20—Invalidity claim chart for '723 in view of Vrazel, *NextGen Innovations, LLC v. Fujitsu Network Communications, Inc*, Case No. 2:22-cv-00307-JRG-RSP, 46 pp. (Feb. 2, 2023).
'Defendants' Appendix B-21—Invalidity claim chart for '723 in view of Vrazel, *NextGen Innovations, LLC v. Fujitsu Network Communications, Inc*, Case No. 2:22-cv-00307-JRG-RSP, 88 pp. (Feb. 2, 2023).
'Defendants' Appendix B-22—Invalidity claim chart for '723 in view of Eroz, *NextGen Innovations, LLC v. Fujitsu Network Communications, Inc*, Case No. 2:22-cv-00307-JRG-RSP, 48 pp. (Feb. 2, 2023).
'Defendants' Appendix B-23—Invalidity claim chart for '723 in view of Keeble, *NextGen Innovations, LLC v. Fujitsu Network Communications, Inc*, Case No. 2:22-cv-00307-JRG-RSP, 31 pp. (Feb. 2, 2023).
'Defendants' Appendix B-24—Invalidity claim chart for '723 in view of Halgren, *NextGen Innovations, LLC v. Fujitsu Network Communications, Inc*, Case No. 2:22-cv-00307-JRG-RSP, 43 pp. (Feb. 2, 2023).
'Defendants' Appendix B-25—Invalidity claim chart for '723 in view of Loheit, *NextGen Innovations, LLC v. Fujitsu Network Communications, Inc*, Case No. 2:22-cv-00307-JRG-RSP, 76 pp. (Feb. 2, 2023).
'Defendants' Appendix B-26—Invalidity claim chart for '723 in view of Brede, *NextGen Innovations, LLC v. Fujitsu Network Communications, Inc*, Case No. 2:22-cv-00307-JRG-RSP, 129 pp. (Feb. 2, 2023).
'Defendants' Appendix B-27—Invalidity claim chart for '723 in view of Sheth, *NextGen Innovations, LLC v. Fujitsu Network Communications, Inc*, Case No. 2:22-cv-00307-JRG-RSP, 72 pp. (Feb. 2, 2023).
'Defendants' Appendix B-28—Invalidity claim chart for '723 in view of Agazzi '341, *NextGen Innovations, LLC v. Fujitsu Network Communications, Inc*, Case No. 2:22-cv-00307-JRG-RSP, 70 pp. (Feb. 2, 2023).
'Defendants' Appendix B-29—Invalidity claim chart for '723 in view of Ahrens, *NextGen Innovations, LLC v. Fujitsu Network Communications, Inc*, Case No. 2:22-cv-00307-JRG-RSP, 48 pp. (Feb. 2, 2023).
'Defendants' Appendix B-30—Invalidity claim chart for '723 in view of HP Module, *NextGen Innovations, LLC v. Fujitsu Network Communications, Inc*, Case No. 2:22-cv-00307-JRG-RSP, 55 pp. (Feb. 2, 2023).

(56) References Cited

OTHER PUBLICATIONS

'Defendants' Appendix B-31—Invalidity claim chart for '723 in view of Mader, *NextGen Innovations, LLC* v. *Fujitsu Network Communications, Inc*, Case No. 2:22-cv-00307-JRG-RSP, 36 pp. (Feb. 2, 2023).
'Defendants' Appendix B-32—Invalidity claim chart for '723 in view of Taborek 1, *NextGen Innovations, LLC* v. *Fujitsu Network Communications, Inc*, Case No. 2:22-cv-00307-JRG-RSP, 53 pp. (Feb. 2, 2023).
'Defendants' Appendix B-33—Invalidity claim chart for '723 in view of Taborek 2, *NextGen Innovations, LLC* v. *Fujitsu Network Communications, Inc*, Case No. 2:22-cv-00307-JRG-RSP, 54 pp. (Feb. 2, 2023).
'Defendants' Appendix B-34—Invalidity claim chart for '723 in view of Chikama, *NextGen Innovations, LLC* v. *Fujitsu Network Communications, Inc*, Case No. 2:22-cv-00307-JRG-RSP, 18 pp. (Feb. 2, 2023).
'Defendants' Appendix B-35—Invalidity claim chart for '723 in view of Derr, *NextGen Innovations, LLC* v. *Fujitsu Network Communications, Inc*, Case No. 2:22-cv-00307-JRG-RSP, 18 pp. (Feb. 2, 2023).
'Defendants' Appendix B-36—Invalidity claim chart for '723 in view of Watanabe, *NextGen Innovations, LLC* v. *Fujitsu Network Communications, Inc*, Case No. 2:22-cv-00307-JRG-RSP, 18 pp. (Feb. 2, 2023).
'Defendants' Appendix B-37—Invalidity claim chart for '723 in view of Doscher, *NextGen Innovations, LLC* v. *Fujitsu Network Communications, Inc*, Case No. 2:22-cv-00307-JRG-RSP, 77 pp. (Feb. 2, 2023).
'Defendants' Appendix B-38—Invalidity claim chart for '723 in view of Howland, *NextGen Innovations, LLC* v. *Fujitsu Network Communications, Inc*, Case No. 2:22-cv-00307-JRG-RSP, 70 pp. (Feb. 2, 2023).
'Defendants' Appendix B-39—Invalidity claim chart for '723 in view of XFP Specification, *NextGen Innovations, LLC* v. *Fujitsu Network Communications, Inc*, Case No. 2:22-cv-00307-JRG-RSP, 87 pp. (Feb. 2, 2023).
'Defendants' Appendix B-40—Invalidity claim chart for '723 in view of SFP MSA, *NextGen Innovations, LLC* v. *Fujitsu Network Communications, Inc*, Case No. 2:22-cv-00307-JRG-RSP, 34 pp. (Feb. 2, 2023).
'Defendants' Appendix B-41—Invalidity claim chart for '723 in view of 1000Base-T Tutorial, *NextGen Innovations, LLC* v. *Fujitsu Network Communications, Inc*, Case No. 2:22-cv-00307-JRG-RSP, 24 pp. (Feb. 2, 2023).
'Defendants' Appendix B-42—Invalidity claim chart for '723 in view of Cardenas, *NextGen Innovations, LLC* v. *Fujitsu Network Communications, Inc*, Case No. 2:22-cv-00307-JRG-RSP, 37 pp. (Feb. 2, 2023).
'Defendants' Appendix B-43—Invalidity claim chart for '723 in view of Zhou, *NextGen Innovations, LLC* v. *Fujitsu Network Communications, Inc*, Case No. 2:22-cv-00307-JRG-RSP, 36 pp. (Feb. 2, 2023).
'Defendants' Appendix B-44—Invalidity claim chart for '723 in view of 100G Ultra Long Haul DWDM Framework Document to Berthold et al. , *NextGen Innovations, LLC* v. *Fujitsu Network Communications, Inc*, Case No. 2:22-ov-00307-JRG-RSP, 36 pp. (Feb. 2, 2023).
'Defendants' Appendix B-45—Invalidity claim chart for '723 in view of Carroll, *NextGen Innovations, LLC* v. *Fujitsu Network Communications, Inc*, Case No. 2:22-cv-00307-JRG-RSP, 76 pp. (Feb. 2, 2023).
'Defendants' Appendix B-46—Invalidity claim chart for '723 in view of Casey, *NextGen Innovations, LLC* v. *Fujitsu Network Communications, Inc*, Case No. 2:22-cv-00307-JRG-RSP, 43 pp. (Feb. 2, 2023).
'Defendants' Appendix B-47—Invalidity claim chart for '723 in view of Fujimori, *NextGen Innovations, LLC* v. *Fujitsu Network Communications, Inc*, Case No. 2:22-cv-00307-JRG-RSP, 72 pp. (Feb. 2, 2023).
'Defendants' Appendix B-48—Invalidity claim chart for '723 in view of Gertel, *NextGen Innovations, LLC* v. *Fujitsu Network Communications, Inc*, Case No. 2:22-cv-00307-JRG-RSP, 68 pp. (Feb. 2, 2023).
'Defendants' Appendix B-49—Invalidity claim chart for '723 in view of Hietala, *NextGen Innovations, LLC* v. *Fujitsu Network Communications, Inc*, Case No. 2:22-cv-00307-JRG-RSP, 79 pp. (Feb. 2, 2023).
'Defendants' Appendix B-50—Invalidity claim chart for '723 in view of Koh, *NextGen Innovations, LLC* v. *Fujitsu Network Communications, Inc*, Case No. 2:22-cv-00307-JRG-RSP, 93 pp. (Feb. 2, 2023).
'Defendants' Appendix B-51—Invalidity claim chart for '723 in view of Nobuyuki, *NextGen Innovations, LLC* v. *Fujitsu Network Communications, Inc*, Case No. 2:22-cv-00307-JRG-RSP, 66 pp. (Feb. 2, 2023).
'Defendants' Appendix B-52—Invalidity claim chart for '723 in view of Otobe, *NextGen Innovations, LLC* v. *Fujitsu Network Communications, Inc*, Case No. 2:22-cv-00307-JRG-RSP, 70 pp. (Feb. 2, 2023).
'Defendants' Appendix B-53—Invalidity claim chart for '723 in view of Poplawski, *NextGen Innovations, LLC* v. *Fujitsu Network Communications, Inc*, Case No. 2:22-cv-00307-JRG-RSP, 79 pp. (Feb. 2, 2023).
'Defendants' Appendix B-54—Invalidity claim chart for '723 in view of Raghavan '904, *NextGen Innovations, LLC* v. *Fujitsu Network Communications, Inc*, Case No. 2:22-cv-00307-JRG-RSP, 85 pp. (Feb. 2, 2023).
'Defendants' Appendix B-55—Invalidity claim chart for '723 in view of Rowan, *NextGen Innovations, LLC* v. *Fujitsu Network Communications, Inc*, Case No. 2:22-cv-00307-JRG-RSP, 78 pp. (Feb. 2, 2023).
'Defendants' Appendix B-56—Invalidity claim chart for '723 in view of Shinobu, *NextGen Innovations, LLC* v. *Fujitsu Network Communications, Inc*, Case No. 2:22-cv-00307-JRG-RSP, 109 pp. (Feb. 2, 2023).
'Defendants' Appendix B-57—Invalidity claim chart for '723 in view of Unitt, *NextGen Innovations, LLC* v. *Fujitsu Network Communications, Inc*, Case No. 2:22-cv-00307-JRG-RSP, 57 pp. (Feb. 2, 2023).
'Defendants' Appendix B-58—Invalidity claim chart for '723 in view of Wei, *NextGen Innovations, LLC* v. *Fujitsu Network Communications, Inc*, Case No. 2:22-cv-00307-JRG-RSP, 74 pp. (Feb. 2, 2023).
'Defendants' Appendix B-59—Invalidity claim chart for '723 in view of Graves, *NextGen Innovations, LLC* v. *Fujitsu Network Communications, Inc*, Case No. 2:22-cv-00307-JRG-RSP, 81 pp. (Feb. 2, 2023).
'Defendants' Appendix B-60—Invalidity claim chart for '723 in view of Levinson, *NextGen Innovations, LLC* v. *Fujitsu Network Communications, Inc*, Case No. 2:22-cv-00307-JRG-RSP, 54 pp. (Feb. 2, 2023).
'Defendants' Appendix B-61—Invalidity claim chart for '723 in view of Weber, *NextGen Innovations, LLC* v. *Fujitsu Network Communications, Inc*, Case No. 2:22-cv-00307-JRG-RSP, 68 pp. (Feb. 2, 2023).
'Defendants' Appendix B-62—Invalidity claim chart for '723 in view of Shi, *NextGen Innovations, LLC* v. *Fujitsu Network Communications, Inc*, Case No. 2:22-cv-00307-JRG-RSP, 50 pp. (Feb. 2, 2023).
'Defendants' Appendix B-63—Invalidity claim chart for '723 in view of Richard, *NextGen Innovations, LLC* v. *Fujitsu Network Communications, Inc*, Case No. 2:22-cv-00307-JRG-RSP, 39 pp. (Feb. 2, 2023).
'Defendants' Appendix B-64—Invalidity claim chart for '723 in view of Xu, *NextGen Innovations, LLC* v. *Fujitsu Network Communications, Inc*, Case No. 2:22-cv-00307-JRG-RSP, 28 pp. (Feb. 2, 2023).
'Defendants' Appendix B-65—Invalidity claim chart for '723 in view of Swenson, *NextGen Innovations, LLC* v. *Fujitsu Network Communications, Inc*, Case No. 2:22-cv-00307-JRG-RSP, 38 pp. (Feb. 2, 2023).

(56) References Cited

OTHER PUBLICATIONS

'Defendants' Appendix B-66—Invalidity claim chart for '723 in view of CAI, *NextGen Innovations, LLC v. Fujitsu Network Communications, Inc*, Case No. 2:22-cv-00307-JRG-RSP, 31 pp. (Feb. 2, 2023).

'Defendants' Appendix B-67—Invalidity claim chart for '723 in view of Liu, *NextGen Innovations, LLC v. Fujitsu Network Communications, Inc*, Case No. 2:22-cv-00307-JRG-RSP, 24 pp. (Feb. 2, 2023).

'Defendants' Appendix B-68—Invalidity claim chart for '723 in view of Zanoni, *NextGen Innovations, LLC v. Fujitsu Network Communications, Inc*, Case No. 2:22-cv-00307-JRG-RSP, 53 pp. (Feb. 2, 2023).

'Defendants' Appendix B-69—Invalidity claim chart for '723 in view of Hudgins, *NextGen Innovations, LLC v. Fujitsu Network Communications, Inc*, Case No. 2:22-cv-00307-JRG-RSP, 49 pp. (Feb. 2, 2023).

'Defendants' Appendix C-Combination, *NextGen Innovations, LLC v. Fujitsu Network Communications, Inc*, Case No. 2:22-cv-00307-JRG-RSP, 23 pp. (Feb. 2, 2023).

'Defendants' Appendix C-01—Invalidity claim chart for '795 in view of Agazzi '640, *NextGen Innovations, LLC v. Fujitsu Network Communications, Inc*, Case No. 2:22-cv-00307-JRG-RSP, 136 pp. (Feb. 2, 2023).

'Defendants' Appendix C-02—Invalidity claim chart for '795 in view of Aronson, *NextGen Innovations, LLC v. Fujitsu Network Communications, Inc*, Case No. 2:22-cv-00307-JRG-RSP, 33 pp. (Feb. 2, 2023).

'Defendants' Appendix C-03—Invalidity claim chart for '795 in view of Azadet, *NextGen Innovations, LLC v. Fujitsu Network Communications, Inc*, Case No. 2:22-cv-00307-JRG-RSP, 56 pp. (Feb. 2, 2023).

'Defendants' Appendix C-04—Invalidity claim chart for '795 in view of CAI, *NextGen Innovations, LLC v. Fujitsu Network Communications, Inc*, Case No. 2:22-cv-00307-JRG-RSP, 65 pp. (Feb. 2, 2023).

'Defendants' Appendix C-05—Invalidity claim chart for '795 in view of Feldman, *NextGen Innovations, LLC v. Fujitsu Network Communications, Inc*, Case No. 2:22-cv-00307-JRG-RSP, 26 pp. (Feb. 2, 2023).

'Defendants' Appendix C-06—Invalidity claim chart for '795 in view of Schonfelder, *NextGen Innovations, LLC v. Fujitsu Network Communications, Inc*, Case No. 2:22-cv-00307-JRG-RSP, 21 pp. (Feb. 2, 2023).

'Defendants' Appendix C-07—Invalidity claim chart for '795 in view of Hidai, *NextGen Innovations, LLC v. Fujitsu Network Communications, Inc*, Case No. 2:22-cv-00307-JRG-RSP, 30 pp. (Feb. 2, 2023).

'Defendants' Appendix C-08—Invalidity claim chart for '795 in view of Ho, *NextGen Innovations, LLC v. Fujitsu Network Communications, Inc*, Case No. 2:22-cv-00307-JRG-RSP, 38 pp. (Feb. 2, 2023).

'Defendants' Appendix C-09—Invalidity claim chart for '795 in view of Jiang, *NextGen Innovations, LLC v. Fujitsu Network Communications, Inc*, Case No. 2:22-cv-00307-JRG-RSP, 120 pp. (Feb. 2, 2023).

'Defendants' Appendix C-10—Invalidity claim chart for '795 in view of Kusiolek, *NextGen Innovations, LLC v. Fujitsu Network Communications, Inc*, Case No. 2:22-cv-00307-JRG-RSP, 40 pp. (Feb. 2, 2023).

'Defendants' Appendix C-11—Invalidity claim chart for '795 in view of Marcionetti, *NextGen Innovations, LLC v. Fujitsu Network Communications, Inc*, Case No. 2:22-cv-00307-JRG-RSP, 163 pp. (Feb. 2, 2023).

'Defendants' Appendix C-12—Invalidity claim chart for '795 in view of Medina, *NextGen Innovations, LLC v. Fujitsu Network Communications, Inc*, Case No. 2:22-cv-00307-JRG-RSP, 26 pp. (Feb. 2, 2023).

'Defendants' Appendix C-13—Invalidity claim chart for '795 in view of Nanzong, *NextGen Innovations, LLC v. Fujitsu Network Communications, Inc*, Case No. 2:22-cv-00307-JRG-RSP, 34 pp. (Feb. 2, 2023).

'Defendants' Appendix C-14—Invalidity claim chart for '795 in view of Newell, *NextGen Innovations, LLC v. Fujitsu Network Communications, Inc*, Case No. 2:22-cv-00307-JRG-RSP, 34 pp. (Feb. 2, 2023).

'Defendants' Appendix C-15—Invalidity claim chart for '795 in view of Pang, *NextGen Innovations, LLC v. Fujitsu Network Communications, Inc*, Case No. 2:22-cv-00307-JRG-RSP, 51 pp. (Feb. 2, 2023).

'Defendants' Appendix C-16—Invalidity claim chart for '795 in view of Poplawski, *NextGen Innovations, LLC v. Fujitsu Network Communications, Inc*, Case No. 2:22-cv-00307-JRG-RSP, 29 pp. (Feb. 2, 2023).

'Defendants' Appendix C-17—Invalidity claim chart for '795 in view of Raghavan, *NextGen Innovations, LLC v. Fujitsu Network Communications, Inc*, Case No. 2:22-cv-00307-JRG-RSP, 32 pp. (Feb. 2, 2023).

'Defendants' Appendix C-18—Invalidity claim chart for '795 in view of Stephenson, *NextGen Innovations, LLC v. Fujitsu Network Communications, Inc*, Case No. 2:22-cv-00307-JRG-RSP, 67 pp. (Feb. 2, 2023).

'Defendants' Appendix C-19—Invalidity claim chart for '795 in view of Tan, *NextGen Innovations, LLC v. Fujitsu Network Communications, Inc*, Case No. 2:22-cv-00307-JRG-RSP, 45 pp. (Feb. 2, 2023).

'Defendants' Appendix C-20—Invalidity claim chart for '795 in view of Vrazel, *NextGen Innovations, LLC v. Fujitsu Network Communications, Inc*, Case No. 2:22-cv-00307-JRG-RSP, 38 pp. (Feb. 2, 2023).

'Defendants' Appendix C-21—Invalidity claim chart for '795 in view of Vrazel, *NextGen Innovations, LLC v. Fujitsu Network Communications, Inc*, Case No. 2:22-cv-00307-JRG-RSP, 61 pp. (Feb. 2, 2023).

'Defendants' Appendix C-22—Invalidity claim chart for '795 in view of Eroz, *NextGen Innovations, LLC v. Fujitsu Network Communications, Inc*, Case No. 2:22-cv-00307-JRG-RSP, 42 pp. (Feb. 2, 2023).

'Defendants' Appendix C-23—Invalidity claim chart for '795 in view of Keeble, *NextGen Innovations, LLC v. Fujitsu Network Communications, Inc*, Case No. 2:22-cv-00307-JRG-RSP, 28 pp. (Feb. 2, 2023).

'Defendants' Appendix C-24—Invalidity claim chart for '795 in view of Halgren, *NextGen Innovations, LLC v. Fujitsu Network Communications, Inc*, Case No. 2:22-cv-00307-JRG-RSP, 39 pp. (Feb. 2, 2023).

'Defendants' Appendix C-25—Invalidity claim chart for '795 in view of Loheit, *NextGen Innovations, LLC v. Fujitsu Network Communications, Inc*, Case No. 2:22-cv-00307-JRG-RSP, 75 pp. (Feb. 2, 2023).

'Defendants' Appendix C-26—Invalidity claim chart for '795 in view of Brede, *NextGen Innovations, LLC v. Fujitsu Network Communications, Inc*, Case No. 2:22-cv-00307-JRG-RSP, 98 pp. (Feb. 2, 2023).

'Defendants' Appendix C-27—Invalidity claim chart for '795 in view of Sheth, *NextGen Innovations, LLC v. Fujitsu Network Communications, Inc*, Case No. 2:22-cv-00307-JRG-RSP, 62 pp. (Feb. 2, 2023).

'Defendants' Appendix C-28—Invalidity claim chart for '795 in view of Agazzi '341, *NextGen Innovations, LLC v. Fujitsu Network Communications, Inc*, Case No. 2:22-cv-00307-JRG-RSP, 56 pp. (Feb. 2, 2023).

'Defendants' Appendix C-29—Invalidity claim chart for '795 in view of Ahrens, *NextGen Innovations, LLC v. Fujitsu Network Communications, Inc*, Case No. 2:22-cv-00307-JRG-RSP, 41 pp. (Feb. 2, 2023).

'Defendants' Appendix C-30—Invalidity claim chart for '795 in view of HP Module, *NextGen Innovations, LLC v. Fujitsu Network Communications, Inc*, Case No. 2:22-cv-00307-JRG-RSP, 53 pp. (Feb. 2, 2023).

(56) References Cited

OTHER PUBLICATIONS

'Defendants' Appendix C-31—Invalidity claim chart for '795 in view of Mader, *NextGen Innovations, LLC v. Fujitsu Network Communications, Inc*, Case No. 2:22-cv-00307-JRG-RSP, 32 pp. (Feb. 2, 2023).
'Defendants' Appendix C-32—Invalidity claim chart for '795 in view of Toborek, *NextGen Innovations, LLC v. Fujitsu Network Communications, Inc*, Case No. 2:22-cv-00307-JRG-RSP, 46 pp. (Feb. 2, 2023).
'Defendants' Appendix C-33—Invalidity claim chart for '795 in view of Toborek 2, *NextGen Innovations, LLC v. Fujitsu Network Communications, Inc*, Case No. 2:22-cv-00307-JRG-RSP, 55 pp. (Feb. 2, 2023).
'Defendants' Appendix C-34—Invalidity claim chart for '795 in view of Chikama, N*NextGen Innovations, LLC v. Fujitsu Network Communications, Inc*, Case No. 2:22-cv-00307-JRG-RSP, 24 pp. (Feb. 2, 2023).
'Defendants' Appendix C-35—Invalidity claim chart for '795 in view of Derr, *NextGen Innovations, LLC v. Fujitsu Network Communications, Inc*, Case No. 2:22-cv-00307-JRG-RSP, 18 pp. (Feb. 2, 2023).
'Defendants' Appendix C-36—Invalidity claim chart for '795 in view of Watanabe, *NextGen Innovations, LLC v. Fujitsu Network Communications, Inc*, Case No. 2:22-cv-00307-JRG-RSP, 20 pp. (Feb. 2, 2023).
'Defendants' Appendix C-37—Invalidity claim chart for '795 in view of Doscher, *NextGen Innovations, LLC v. Fujitsu Network Communications, Inc*, Case No. 2:22-cv-00307-JRG-RSP, 69 pp. (Feb. 2, 2023).
Howard Frazier, "IEEE 802.3, Higher Speed Study Group 10Gig MII update", Nov. 9, 1999, 24 pages, IEEE Higher Speed Study Group (HSSG) meeting in Kauai, HI.
"Interface locations, HARI", Nov. 9, 1999, 3 pages, IEEE Higher Speed Study Group (HSSG) meeting.
"SFF Committee SFF-8053 Specification for GBIC (Gigabit Interface Converter) Rev 5.5", Sep. 27, 2000, 83 pages, This specification was developed by the Small Form-Factor (SFF) Committee prior to it becoming the SFF TA Technology Affiliate) TWG (Technical Working Group) of SNIA (Storage Networking Industry Association).
Ali Ghiasi, "Hari The Universal Electrical Interface", Nov. 5, 1999, 15 pages, Sun Microsystems, Companies participated in the conference calls.
David Kabal, "Optical Ethernet in the First Mile", Jan. 8, 2001, 5 pages, PicoLight, IEEE EFM Jan. 2001 meeting.
Paul Kolesar, "Viable PMDs for 10 G Ethernet", Mar. 9, 1999, 1 page, IEEE Austin, TX.
Onn Haran, "3-Layer EPON Protocol", Sep. 10, 2001, 25 pages, IEEE 802.3ah meeting in Copenhagen.
David Law, "Architecting the Document", Jun. 1999, 8 pages, 3COM, IEEE 802.3 Higher Speed Study Group (HSSG) meeting.
Brian E. Lemoof, "WWDM Transceiver Module for 10-GB/s Ethernet", Jun. 1-3, 1999, 32 pages, Hewlett Packard, IEEE 802.3 HSSG Interim meeting in Coeur d'Alene, Idaho.
Bane Vasic et al., "Low-Density Parity Check Codes for Long-Haul Optical Communication Systems", Aug. 2002, 3 pages, IEEE Photonics Technology Letters, vol. 14, No. 8.
Fred Mohannadi, "A 10 Gbps (4 X 3.125 GBd) Transceiver", Apr. 28, 2000, 6 pages, Broadcom.
Shimon Muller, "Architecture for a 10-Gigabit Ethernet Standard", Jun. 1, 1999, 26 pages, Sun Microsystems, IEEE 802.3 High Speed Study Group (HSSG) meeting.
Martin Nuss, "10 GB/s Serial PHY for Local Area Networks", Jul. 5-9, 1999, 14 pages, IEEE 802.3 HSSG Meeting Montreal.
Isaac Shpantzer, "A New Generation of Coherent ULH Fiber-Optic Communication", Jul. 8th, 2002, 14 pages, CeLight, 40G Workshop, OECC-2002 Conference Yokohama, Japan.
Robert Barrett, "Ethernet PON (EPON) and the PAR + 5 Criteria", May 21-23, 2001, 16 pages, IEEE 802.3 EFM Study Group meeting in St. Louis, MO.

Mike Salzman, "10 Gigabit Ethernet Application Requirements and Proposed Layer Architecture", Feb. 6, 1999, 18 pages, Lucent Technologies.
Constantinos B. Papadias et al., "On the Decision-Directed Equalization of Constant Modulus Signals", Proceedings of the 1994 28th Asilomar Conference on Signals, Systems, and Computers, 1994, 5 pages, Pacific Grove, CA, USA.
John M. Senior, "Optical Fiber Communications Principles and Practice", 1985, 6 pages, Prentice-Hall, Engelwood Cliffs, NJ.
Rajiv Ramaswami et al., "Optical Networks: A Practical Perspective", 2002, 32 pages, Morgan Kaufmann Publishers, New York, Second Edition.
ETRI, "Optical Transceiver Technology and Its Trend", 2009, 12 pages.
Kenneth H. Hahn et al., "Gigabyte/s Data Communications with the POLO Parallel Optical Link", May 1996, 7 pages, IEEE 1996 Electronic Components and Technology Conference.
SFF Committee, "SFF-8431 Specifications for Enhanced Small Form Factor Pluggable Module SFP+ Revision 4.1", Jul. 6, 2009, 136 pages, includes Rev 4.1 Addendum published on Sep. 15, 2013.
Michael G. Taylor, "Coherent Detection Method Using DSP for Demodulation of Signal and Subsequent-qualization of Propagation Impairments", Feb. 2004, 3 pages, IEEE Photonics Technology Letters, vol. 16, No. 2.
Douglas a Kerr, "The AT&T U-verse Service, The story of the U-verse installation at the author's home is given", Jun. 5, 2009, 23 pages, Issue 2.
IEEE-SA Standards BOARD,"802.3u-1995, Media Access Control (MAC) Parameters, Physical Layer, Medium Attachment Units, and Repeater for 100 Mb/s Operation, Type 100BASE-T (Clauses 21-30)", Jun. 14, 1995, 415 pages. The Institute of Electrical and Electronics Engineers, Inc., 345 East 47th Street, New York, NY 10017-2394, USA, ISBN 1-55937-542-6.
Shigeru Inano et al., Development of SFP+ (the smallest 10Gbit/s pluggable optical transceiver), Apr. 2009, 5 pages, SEI Technical Review—No. 68.
SFF Committee, "INF-8074li Specification for SFP (Small Formfactor Pluggable) Transceiver Rev 1.0", May 12, 2001, 39 pages, This specification was developed by the SFF Committee prior to it becoming the SFF TA (Technology Affiliate) TWG (Technical Working Group) of SNIA (Storage Networking Industry Association).
SFF Committee, "INF-84741i Specification for Xenpak 10 Gigabit Ethernet Transceiver Rev 3.0", Sep. 18, 2002, 81 pages, the SFF Committee have either been incorporated into standards or adopted as standards by EIA Electronic Industries Association), ANSI (American National Standards Institute) and IEC (International Electrotechnical Commission).
XPAK MSA Group, "INF-8475i Specification for XPAK Small Formfactor Pluggable Transceiver Rev 2.2", Dec. 5, 2002, 46 pages, SFF Committee.
Satoshi Ueno et al., "5.5 A Single-Chip 10Gb/s Transceiver LSI using SiGe SOI/BiCMOS", 2001, 3 pages, ISSCC 2001 Session 5 Gigabit Opticalcommunications at 2001 IEEE international Solid-State Circuits Conference.
Sheldon Walklin, "Multilevel Signaling for Increasing the Reach of 10 GB/s Lightwave Systems", Journal of Lightwave Technology, Nov. 1999, 14 pages, vol. 17, No. 11.
"X2 MSA 10G, A Cooperation Agreement for a Small Versatile 10 Gigabit Transceiver Package, Issue 9", Jul. 31, 2002, 23 pages.
"XFP MSA 10G, 10 Gigabit Small Form Factor Pluggable Module, Revision 2.0", Dec. 16, 2002, 171 pages, Copyright 2002 by XFP MSA.
Lori L. Jeromin, et al., "M-ary FSK Performance for Coherent Optical Communication Systems Using Semiconductor Lasers", IEEE Transactions on Communications, Apr. 1986, 7 pages, vol. COM-34, No. 4.
"10Gb/s Ethernet call for interest Mar. 1999 Plenary week meeting, Austin TX", Mar. 9-10th, 1999, 2 pages, IEEE https://www.ieee802.org/3/10G_study/public/march99/.

(56) References Cited

OTHER PUBLICATIONS

Joseph M. Kahn et al., "Spectral Efficiency Limits and Modulation/Detection Techniques for DWDM Systems", Apr. 2004, 14 pages, IEEE Journal of Selected Topics in Quantum Electronics, vol. 10, No. 2.
Edward Harstead et al., "Chapter 10: Optical Access Networks", 2002, 78 pages, Optical Fiber Telecommunications, vol. IVB, ISBN: 0-12-395173-9.
Cedric F. Lam, "Chapter 11: Beyond Gigabit: Application and Development of High-Speed Ethernet Technology", 2002, 50 pages, Optical Fiber Telecommunications, vol. IVB, ISBN: 0-12-395173-9.
Jan Conradi, "Chapter 16: Bandwidth-Efficient Modulation Formats for Digital Fiber Transmission Systems", 2002, 10 pages, Optical Fiber Telecommunications, vol. IVB, ISBN: 0-12-395173-9.
P. Vijay Kumar et al., "Chapter 17| Error-Control Coding Techniques and Applications", 2002, 63 pages, Optical Fiber Telecommunications, vol. IVB, ISBN: 0-12-395173-9.
Ly-Gagnon et al., "Coherent Detection of Optical Quadrature Phase-Shift Keying Signals With Carrier Phase Estimation", Jan. 2006, 6 pages, IEEE Xplore Journal of Lightwave Technology, vol. 24, No. 1.
Thomas Mader, "Design of High-Speed Fiber Optic Datalinks", 2002, 4 pages, IEEE Radio Frequency Integrated Circuits Symposium.
Oscar Agazzi, "10Gb/s PMD Using PAM-5 Modulation", Jan. 18-20, 2000, 19 pages, IEEE 802.3 Dallas.
Oscar Agazzi et al., "10Gb/s PMD Using PAM-5 Trellis Coded Modulation", Mar. 6-10, 2000, 38 pages, IEEE 802.3 Albuquerque.
Deepak Ayyagari, "Access Control in Ethernet PON", Jul. 9, 2001, 15 pages, ADC Telecom.
Ingo Mollers et al., "Plastic Optical Fiber Technology for Reliable Home Networking: Overview and Results of the EU Project POF-ALL", IEEE Communications Magazine, Aug. 2009, 11 pages.
Kamran Azadet, "Forward Error Correction (FEC) techniques for optical communications", Jul. 1999, 31 pages, Lucent Technologies, IEEE 802.3 High-Speed Study Group Plenary meeting, Montreal.
Michael Bennett, "User's Perspective for Ten Gigabit Ethernet", Jun. 1-4, 1999, 17 pages, Lawrence Berkeley National Lab, IEEE HSSG meeting Coer d'Alene, Idaho.
V. Bhatt, "Update on Serial PMD Activities" Jan. 18, 2000, 15 pages, IEEE 802.3ae High Speed Study Group, IEEE HSSG Interim Dallas.
D. Richard Johnson et al., "Blind Equalization Using the Constant Modulus Criterion: A Review", Oct. 1998, 24 pages, Proceedings of the IEEE, vol. 86, No. 10.
Paul A. Bottorff, "10 Gigabit Ethernet, IEEE 802.3 Call For Interest", Mar. 9, 1999, 9 pages, Nortel Networks, IEEE 802.3 meeting.
Greg Copeland, "Duobinary Coding for 1OGbE", Oct. 25, 1999, 16 pages, IDT, IEEE 802.3-99 meeting.
Edward Cornejo, "Serial Physical Layer Approach for 10GbE", Mar. 1999, Lucent Technologies, IEEE Plenary meeting.
"Multi Source Agreement for 10Gig Transponder", Sep. 2000, 6 pages, Infineon Technologies, JDS Uniphase Corporation Lightlogic Inc, Nortel Networks Limited, IEEE 802.3ae 10 GbE meeting.
Daniel Dove, "10 Gigabit Ethernet Concepts & Concerns", Mar. 10, 1999, Hewlett Packard HP ProCurve Networks.
Jonathan Thatcher, "802.3 Working Group 10 Gig Ethernet Call for Interest", Mar. 1999, 19 pages.
Jim Tavacoli, "Challenges in Designing 10 GB/S Backplanes", IEEE 802.3ae Task Force, Sep. 2000, 10 pages, New Orleans, LA.
Ganter et al., "10 km multimode fiber transmission with dispersion-resistant synthetic intensity modulation", Franscendata, Inc, 1999, 6 pages.
Richard Taborek, "MultiLevel MultiChannel PMD Proposal", IEEE 802.3ae Task Force, Jan. 18, 2000, 8 pags, Dallas, TX.
Rich Taborek, "Hari Coding Objectives", IEEE 802.3 HSSG, Nov. 9, 1999, 19 pages.
Rich Taborek, "Multilevel Analog Signaling—a 10 Gigabit Technology", IEEE 802.3 10GbE CFI, Mar. 9, 1999, 17 pages, Austin, TX.
Steve Swanson, "Selecting 10GbE PMDs", IEEE 802.3ae Plenary Meeting, Jul. 11, 2000, 8 pages, La Jolla, CA.
Simoneaux et al., "XGP MSA (Multi-Source Agreement) Group Overview and Status Report", IEEE 802.3ae Interim Meeting, Sep. 12-14, 2000, 8 pages, New Orleans, LA.
Oksman et al., "Ethernet packet enscapsulation", EFM Copper Track, May 2002, 5 pages, Edinburgh.
Shpantzer et al., "Coherent Optical Fiber Communication Architecture, Modeling, and Optimization", SCEE conference presentation, Jun. 25, 2002, 39 pages, Eindhoven, NL.
"Broadband Access Equipment," Communications Engineering, 2007, available at https://communicationsengineering.files.wordpress.com/2007/11/broadband-access-equipment.pdf.
Silvello Betti et al., "Coherent Optical Communication Systems," John Wiley & Sons Inc., Mew York, 1995, 2 pages.
Pesavento et al., "IEEE 802.3 Ethernet in the First Mile Tutorial Session", IEEE 802 LAN/MAN Standard Committee, Jul. 2001, 1 page, Portland, OR.
"SFF Committee INF-0804i Specification for SFP Transceiver", SFF Commitee, May 12, 2001, 39 pages.
"Product Specification for SFP Transceiver FTRJ-8519-7D", Jan. 14, 2002,10 pages, Finisar Corporation, Sunnyvale, CA.
Renaud Lavoie, "The evolution of the pluggable module", Broadcast Engineering magazine, Aug. 2012, 7 pages.
Richard Gitlin, "Electrical Signal Processing Techniques in Long-Haul Fiber-Optic Systems", IEEE Transanctions an Communications, Sep. 1990, 1439-1453pp, vol. 38 No. 9.
"Using EDC to Relax Component Specifications", IEEE 802.3, Vanuouver BC, Jan. 11-15, 2004, 13 pages.
Fadi Saibi, "Signal processing for high-capacity bandwidth efficient optical communications", Telecom ParisTech, Feb. 18, 2005, 316 pages.
Emil Yu-Ming Choa, "Low Power Mixed-Mode CMOS Circuit Design Techniques for Optical Network Communications", UCI Dissertation, Proquest Information and Learning Company, 2003, 24 pages.
Nielson et al., "OFC 2004 Workshop on Optical and Electronic Mitigation of Impairments", Journal of Lightwave Technology, Jan. 2005, 131-142 pp, vol. 23, No. 1.
Winston Way, "Part Two of 'Optical Network Architecture and Apparatus for High Capacity Upgrade", Jun. 11, 200S 9 pages.
Acacia Communications, "Network Optimization in the 600G Era", Acacia Communications, Dec. 18, 2018, 13 pages.
Kasturia et al., "Techniques for High-Speed Implementation of Nonlinear Cancellation", IEEE Journal on Selected Areas in Communications, Jun. 1991, 711-717 pp, vol. 9, No. 5.
Berger et al., "High-density optical interconnects within large-scale systems", Proceedings of SPIE—The International Society for Optical Engineering, Apr. 2003, 15 pages.
Hoshida et al., "Design Optimization of 40 GB/s RZ-DQPSK Transceiver for High OSNR and PMD Tolerance under Fast Polarization Changes", Downloaded on Aug. 25, 2022 from IEEE Xplore, 2 pages.
Ghiasi et al., "Benefits of EDC and Linear Receivers for Short Reach 40/100GE", IEEE Communications Magazine, Feb. 2008, S17-S21 pp.
Wu et al., "A serial 10 Gigabit Ethernet Transceiver on Digital 0.13um CMOS", Downloaded on Aug. 24, 2022 from IEEE Xplore, 2003, 4 pages.
Ellersick et al., "A serial-link Transceiver Base on 86Sample/s A/D and D/A Converters on 0.25um CMOS", IEEE International Solid-State Circuits Conference, 2001, 3 pages.
Kenney et al., "A 9.95-11 3-GB/s XFP Transceiver in 0.13-um CMOS", IEEE Journal of Solid-State Circuits, Dec. 2006, 2901-2910 pp, vol. 41, No. 12.
Winston Way, "Optical network architecture and apparatus for high capacity upgrade", May 20, 2009, 20 pages.
Cole et al., "100GbE- Optical LAN Technologies", IEEE Applications & Practice, Dec. 2007, 12-19 pages.

(56) References Cited

OTHER PUBLICATIONS

Mark Telford, "Shrinking drive InP integration", The Advanced Semiconductor Magazine, Jun./Jul. 2003, 42-45 pp, vol. 16, No. 5.
Ly et al., "P2MP Fiber General Architecture Proposal", EFM Oct. 17-19, 2001 Los Angeles meeting, 3 pages, https://www.ieee802.org/3/efm/public/sep01/soto_2_0901.pdf.
Solina et al., "Burst Mode Technology", Telecom Lab Italia and Quantum Bridge, May 2002, 37 pages, https://www.ieee802.org/3/efm/public/may02/solina_1_0502.pdf.
Ly et al., "Protocol Independent PHY Specific Sub-layer (PSS) for Pon", IEEE EFM Interim Los Angeles, Oct. 2001, 23 pages, https:/www.ieee802.org/3/efm/public/sep01/ly_1_0901.pdf.
Kramer et al., "What is Ethernet Access Network", IEEE 802.3ah Los Angeles, Oct. 15, 2001, 25 pages.
Summalla et al., "P2MP Optics Alignment", ITU-T Q2 15 == IEEE 802.3ah, Nov. 2002, 11 pages, https://www.ieee802.org/3/efm/public/nov02/optics/effenberger_optics_1_1102 pdf.
Ford et al., "P2MP Optics Baseline", IEEE slide presentation, Juuly 2002, 16 pages, available at https://www.ieee802.org/3/efm/public/jul02/optics/effenberger_optics_1_0702.pdf.
Frank Effenberger, "PON PMD Timing", IEEE slide presentation, Jan. 2003, 28 pages, https://www.ieee802.org/3/efm/public/jan03/optics/effenberger_optics_1_0103.pdf.
Yoshiko Hara, "NTT launches 100Mbit/s fiber-optic service", EE Times, Aug. 3, 2001, 2 pages, http://web.archive.org/web/20020321143121/http://www.eetimes.com/story/OEG20010803S0003.
US Dept, of Justice, "Voice, Video, and Broadband: The Changing Competitive Landscape and its Impact on Consumers", Nov. 2008, 114 pages.
Shraga et al., "PMD Burst Mode Dynamic Performance Requirement", EFM Los Angeles, Oct. 17-19, 2001, 17 pages, https://www.ieee802.org/3/efm/public/sep01/soto_1_0901 pdf.
Casimer Decusatis, "Handbook of Fiber Optic Data Communication", 2008, 797 pages, Third Edition, Elsevier Academic Press, UK.
Martin et al., "FCC 05-150", Federal Communications Commission, Sep. 23, 2005, 133 pages.
Frank Effenberger, "Draft new Recommendation 984.3—Transmission Convergence Layer for Gigabit Passive Optical Networks", International Telecommunication Union Study Group 15, Oct. 21-31, 2003, 112 pages.
J.R. Stern, "Passive Optical Local Networks for Telephony Applications and Beyond", Electronic Letters, Nov. 19, 1987, 1255-1257 pp, vol. 23, No. 24.
Corvaja et al., "Phase noise effects in QAM systems", IEEE, 1997, 453-456 pp.
Leon-Garcia et al., "Communication Networks", 2000,125-133pp and 153-177 pp, McGraw-Hill Higher Education, NY.
Ben Yu, "Technology Issues for 10 Gigabit Ethernet", IEEE 802.3, Mar. 1999, 18 pages.
Frederick Weniger, "10GbE Serial Technology Proposal", IEEE presentation, Jul. 7, 1999, 6 pages.
"10 Gigabit/sec Status and Technology", Siemens, Aug. 3, 1999, 12 pages.
Bruce Tolley, "Market Requirements for 10 GbE", IEEE 802.3 presentation Austin Texas, Mar. 9, 1999, 22 pages.
Yang et al., "The Multimodulus Blind Equalization Algorithm", IEEE, 1997, 4 pages.
Jonathan Thatcher, "802.3 Working Group 10 Gig Ethernet Call for Interest Ad Hoc Meeting Summary", Mar. 1999, 25 pages.
Jonathan Thatcher, "Common PMD Interface 'Hari'", IEEE 302.3 HSSG, Nov. 1999, 20 pages, Kauai, HI.
Lisa Buckman, "DemonsliaLion of a Small-Form-Factor WWDM Transceiver Module for 10-GB/s Local Area Networks", IEEE Photonics Technology Letters, May 2002, vol. 14, No. 5.
Lisa Buckman, "A low-cost compact multimode/singlemode WWDM transceiver module for 10-GB/s applications", Optical Fiber Communication Conference. Technical Digest Post Conference Edition. Trends in Optics and Photonics, Mar. 2000, vol. 37.

Brian E. Lemoff, "WWDM Transceiver Update and 1310 nm eye-safety", IEEE 802.3 HSSG Meeting in Montreal Quebec, Jul. 5-9, 1999.
Thomas Mader, "Design of High-Speed Fiber Optic Datalinks", 2002 IEEE Radio Frequency Integrated Circuits Symposium, Nov. 1999.
Rich Taborek, "Multi-Level Serial PMD Update", IEEE 802.3 Higher Speed Study Group, Nov. 1999.
Rich Taborek, "Multilevel Analog Signaling Technology and Applications", IEEE 802.3 Higher Speed Study Group, Jun. 1999.
Terumi Chikama, "Modulation and Demodulation Techniques in Optical Heterodyne PSK Transmission Systems", J. Lightwave Tech, Mar. 1990, vol. 8 No. 3.
Frowin Derr, "Coherent Optical QPSK Intradyne System: Concept and Digital Receiver Realization", J. Lightwave Tech., Sep. 1992, vol. 10, No. 9.
Shigeki Watanabe, "Recent Process on PSK Coherent Systems at Fujitsu Laboratories", SPIE Nol. 1775, Feb. 5, 1990, Coherent Lightwave Communications.
James Doscher, "New 10-Gbit/sec ICs support emerging optical interfaces", Lightwaveonline.com, Dec. 1, 2002.
Chris Howland, "Algorithms and Architectures for Low-Density Parity-Check Codecs", Dissertation submitted to the Department of Electrical and Electronic Engineering, University of Adelaide, Oct. 7, 2002.
Ghiasi et al., "10 Gigabit Small Form Factor Pluggable Module", XFP Specification, Revision 2.0, Dec. 16, 2002.
"Cooperation Agreement for Small Form-Factor Pluggable Transceivers", SFP MSA, Sep. 14, 2000.
"1000BASE-T Tutorial Presentation, Irvine, CA, IEEE 802.3ab", 1000BASE-T Tutorial, Mar. 9-12, 1997.
"OIF, 100G Ultra Long Haul DWDM Framework Document", OIF, Jun. 2009.
'Defendants' P.R. 3-3 and 3-4 Disclosures, *NextGen Innovations, LLC* v. *Fujitsu Network Communications, Inc*, Case No. 2:22-cv-00307-JRG-RSP, 216 pp. (Feb. 2, 2023).
'Defendants' Appendix A-Combination, *NextGen Innovations, LLC* v. *Fujitsu Network Communications, Inc*, Case No. 2:22-cv-00307-JRG-RSP, 23 pp. (Feb. 2, 2023).
'Defendants' Appendix A-01—Invalidity claim chart for '181 in view of Agazzi '640, *NextGen Innovations, LLC* v. *Fujitsu Network Communications, Inc*, Case No. 2:22-cv-00307-JRG-RSP, 155 pp. (Feb. 2, 2023).
'Defendants' Appendix A-02—Invalidity claim chart for '181 in view of Aronson, *NextGen Innovations, LLC* v. *Fujitsu Network Communications, Inc*, Case No. 2:22-cv-00307-JRG-RSP, 49 pp. (Feb. 2, 2023).
'Defendants' Appendix A-03—Invalidity claim chart for '181 in view of Azadet, *NextGen Innovations, LLC* v. *Fujitsu Network Communications, Inc*, Case No. 2:22-cv-00307-JRG-RSP, 63 pp. (Feb. 2, 2023).
'Defendants' Appendix A-04—Invalidity claim chart for '181 in view of CAI, *NextGen Innovations, LLC* v. *Fujitsu Network Communications, Inc*, Case No. 2:22-cv-00307-JRG-RSP, 71 pp (Feb. 2, 2023).
'Defendants' Appendix A-05—Invalidity claim chart for '181 in view of Feldman, *NextGen Innovations, LLC* v. *Fujitsu Network Communications, Inc*, Case No. 2:22-cv-00307-JRG-RSP, 44 pp. (Feb. 2, 2023).
'Defendants' Appendix A-06—Invalidity claim chart for '181 in view of Fisher, *NextGen Innovations, LLC* v. *Fujitsu Network Communications, Inc*, Case No. 2:22-cv-00307-JRG-RSP, 37 pp. (Feb. 2, 2023).
'Defendants' Appendix A-07—Invalidity claim chart for '181 in view of Hidai, *NextGen Innovations, LLC* v. *Fujitsu Network Communications, Inc*, Case No. 2:22-cv-00307-JRG-RSP, 43 pp. (Feb. 2, 2023).
'Defendants' Appendix A-08—Invalidity claim chart for '181 in view of Ho, *NextGen Innovations, LLC* v. *Fujitsu Network Communications, Inc*, Case No. 2:22-cv-00307-JRG-RSP, 55 pp. (Feb. 2, 2023).

(56) References Cited

OTHER PUBLICATIONS

'Defendants' Appendix A-09—Invalidity claim chart for '181 in view of Jiang, *NextGen Innovations, LLC* v. *Fujitsu Network Communications, Inc*, Case No. 2:22-cv-00307-JRG-RSP, 145 pp. (Feb. 2, 2023).
'Defendants' Appendix A-10—Invalidity claim chart for '181 in view of Kusiolek, *NextGen Innovations, LLC* v. *Fujitsu Network Communications, Inc*, Case No. 2:22-cv-00307-JRG-RSP, 57 pp. (Feb. 2, 2023).
'Defendants' Appendix A-11—Invalidity claim chart for '181 in view of Marcionetti, *NextGen Innovations, LLC* v. *Fujitsu Network Communications, Inc*, Case No. 2:22-cv-00307-JRG-RSP, 127 pp. (Feb. 2, 2023).
'Defendants' Appendix A-12—Invalidity claim chart for '181 in view of Medina, *NextGen Innovations, LLC* v. *Fujitsu Network Communications, Inc*, Case No. 2:22-cv-00307-JRG-RSP, 38 pp (Feb. 2, 2023).
'Defendants' Appendix A-13—Invalidity claim chart for '181 in view of Nanzong, *NextGen Innovations, LLC* v. *Fujitsu Network Communications, Inc*, Case No. 2:22-cv-00307-JRG-RSP, 52 pp. (Feb. 2, 2023).
'Defendants' Appendix A-14—Invalidity claim chart for '181 in view of Newell, *NextGen Innovations, LLC* v. *Fujitsu Network Communications, Inc*, Case No. 2:22-cv-00307-JRG-RSP, 55 pp. (Feb. 2, 2023).
'Defendants' Appendix A-15—Invalidity claim chart for '181 in view of Pang, *NextGen Innovations, LLC* v. *Fujitsu Network Communications, Inc*, Case No. 2:22-cv-00307-JRG-RSP, 70 pp. (Feb. 2, 2023).
'Defendants' Appendix A-16—Invalidity claim chart for '181 in view of Poplawski, *NextGen Innovations, LLC* v. *Fujitsu Network Communications, Inc*, Case No. 2:22-cv-00307-JRG-RSP, 44 pp. (Feb. 2, 2023).
'Defendants' Appendix A-17—Invalidity claim chart for '181 in view of Raghavan, *NextGen Innovations, LLC* v. *Fujitsu Network Communications, Inc*, Case No. 2:22-cv-00307-JRG-RSP, 60 pp. (Feb. 2, 2023).
'Defendants' Appendix A-18—Invalidity claim chart for '181 in view of Stephenson, *NextGen Innovations, LLC* v. *Fujitsu Network Communications, Inc*, Case No. 2:22-cv-00307-JRG-RSP, 82 pp. (Feb. 2, 2023).
'Defendants' Appendix A-19—Invalidity claim chart for '181 in view of Tan, *NextGen Innovations, LLC* v. *Fujitsu Network Communications, Inc*, Case No. 2:22-cv-00307-JRG-RSP, 63 pp. (Feb. 2, 2023).
'Defendants' Appendix A-20—Invalidity claim chart for '181 in view of Vrazel, *NextGen Innovations, LLC* v. *Fujitsu Network Communications, Inc*, Case No. 2:22-cv-00307-JRG-RSP, 56 pp. (Feb. 2, 2023).
'Defendants' Appendix A-21—Invalidity claim chart for '181 in view of Vrazel, *NextGen Innovations, LLC* v. *Fujitsu Network Communications, Inc*, Case No. 2:22-cv-00307-JRG-RSP, 84 pp. (Feb. 2, 2023).
'Defendants' Appendix A-22—Invalidity claim chart for '181 in view of Eroz, *NextGen Innovations, LLC* v. *Fujitsu Network Communications, Inc*, Case No. 2:22-cv-00307-JRG-RSP, 50 pp (Feb. 2, 2023).
'Defendants' Appendix A-23—Invalidity claim chart for '181 in view of Keeble, *NextGen Innovations, LLC* v. *Fujitsu Network Communications, Inc*, Case No. 2:22-cv-00307-JRG-RSP, 43 pp. (Feb. 2, 2023).
'Defendants' Appendix A-24—Invalidity claim chart for '181 in view of Halgen, *NextGen Innovations, LLC* v. *Fujitsu Network Communications, Inc*, Case No. 2:22-cv-00307-JRG-RSP, 48 pp. (Feb. 2, 2023).
'Defendants' Appendix A-25—Invalidity claim chart for '181 in view of Loheit, *NextGen Innovations, LLC* v. *Fujitsu Network Communications, Inc*, Case No. 2:22-cv-00307-JRG-RSP, 77 pp. (Feb. 2, 2023).
'Defendants' Appendix A-26—Invalidity claim chart for '181 in view of Brede, *NextGen Innovations, LLC* v. *Fujitsu Network Communications, Inc*, Case No. 2:22-cv-00307-JRG-RSP, 120 pp. (Feb. 2, 2023).
'Defendants' Appendix A-27—Invalidity claim chart for '181 in view of Sheth, *NextGen Innovations, LLC* v. *Fujitsu Network Communications, Inc*, Case No. 2:22-cv-00307-JRG-RSP, 78 pp. (Feb. 2, 2023).
'Defendants' Appendix A-28—Invalidity claim chart for '181 in view of Agazzi '341, *NextGen Innovations, LLC* v. *Fujitsu Network Communications, Inc*, Case No. 2:22-cv-00307-JRG-RSP, 73 pp. (Feb. 2, 2023).
'Defendants' Appendix A-29—Invalidity claim chart for '181 in view of Ahrens, *NextGen Innovations, LLC* v. *Fujitsu Network Communications, Inc*, Case No. 2:22-cv-00307-JRG-RSP, 57 pp. (Feb. 2, 2023).
'Defendants' Appendix A-30—Invalidity claim chart for '181 in view of HP Module, *NextGen Innovations, LLC* v. *Fujitsu Network Communications, Inc*, Case No. 2:22-cv-00307-JRG-RSP, 70 pp. (Feb. 2, 2023).
'Defendants' Appendix A-31—Invalidity claim chart for '181 in view of Mader, *NextGen Innovations, LLC* v. *Fujitsu Network Communications, Inc*, Case No. 2:22-cv-00307-JRG-RSP, 50 pp. (Feb. 2, 2023).
'Defendants' Appendix A-32—Invalidity claim chart for '181 in view of Taborek, *NextGen Innovations, LLC* v. *Fujitsu Network Communications, Inc*, Case No. 2:22-cv-00307-JRG-RSP, 92 pp. (Feb. 2, 2023).
'Defendants' Appendix A-33—Invalidity claim chart for '181 in view of Taborek, *NextGen Innovations, LLC* v. *Fujitsu Network Communications, Inc*, Case No. 2:22-cv-00307-JRG-RSP, 87 pp. (Feb. 2, 2023).
'Defendants' Appendix A-34—Invalidity claim chart for '181 in view of Chikama, *NextGen Innovations, LLC* v. *Fujitsu Network Communications, Inc*, Case No. 2:22-cv-00307-JRG-RSP, 30 pp. (Feb. 2, 2023).
'Defendants' Appendix A-35—Invalidity claim chart for '181 in view of Derr, *NextGen Innovations, LLC* v. *Fujitsu Network Communications, Inc*, Case No. 2:22-cv-00307-JRG-RSP, 28 pp. (Feb. 2, 2023).
'Defendants' Appendix A-36—Invalidity claim chart for '181 in view of Watanabe, *NextGen Innovations, LLC* v. *Fujitsu Network Communications, Inc*, Case No. 2:22-cv-00307-JRG-RSP, 30 pp. (Feb. 2, 2023).
'Defendants' Appendix A-37—Invalidity claim chart for '181 in view of Doscher, *NextGen Innovations, LLC* v. *Fujitsu Network Communications, Inc*, Case No. 2:22-cv-00307-JRG-RSP, 83 pp. (Feb. 2, 2023).
'Defendants' Appendix A-38—Invalidity claim chart for '181 in view of Howland, *NextGen Innovations, LLC* v. *Fujitsu Network Communications, Inc*, Case No. 2:22-cv-00307-JRG-RSP, 69 pp. (Feb. 2, 2023).
'Defendants' Appendix A-39—Invalidity claim chart for '181 in view of XFP Specification, *NextGen Innovations, LLC* v. *Fujitsu Network Communications, Inc*, Case No. 2:22-cv-00307-JRG-RSP, 91 pp. (Feb. 2, 2023).
'Defendants' Appendix A-40—Invalidity claim chart for '181 in view of SFP MSA, *NextGen Innovations, LLC* v. *Fujitsu Network Communications, Inc*, Case No. 2:22-cv-00307-JRG-RSP, 45 pp. (Feb. 2, 2023).
'Defendants' Appendix A-41—Invalidity claim chart for '181 in view of 1000Base-T Tutorial, *NextGen Innovations, LLC* v. *Fujitsu Network Communications, Inc*, Case No. 2:22-cv-00307-JRG-RSP, 36 pp. (Feb. 2, 2023).
'Defendants' Appendix A-42—Invalidity claim chart for '181 in view of Cardenas, *NextGen Innovations, LLC* v. *Fujitsu Network Communications, Inc*, Case No. 2:22-cv-00307-JRG-RSP, 45 pp. (Feb. 2, 2023).
'Defendants' Appendix A-43—Invalidity claim chart for '181 in view of Zhou, *NextGen Innovations, LLC* v. *Fujitsu Network Communications, Inc*, Case No. 2:22-cv-00307-JRG-RSP, 46 pp. (Feb. 2, 2023).

(56) References Cited

OTHER PUBLICATIONS

'Defendants' Appendix A-44—Invalidity claim chart for '181 in view of DWDM Ultra Long Haul to Berthold, *NextGen Innovations, LLC v. Fujitsu Network Communications, Inc*, Case No. 2:22-cv-00307-JRG-RSP, 43 pp. (Feb. 2, 2023).

'Defendants' Appendix A-45—Invalidity claim chart for '181 in view of Carroll, *NextGen Innovations, LLC v. Fujitsu Network Communications, Inc*, Case No. 2:22-cv-00307-JRG-RSP, 81 pp. (Feb. 2, 2023).

'Defendants' Appendix A-46—Invalidity claim chart for '181 in view of Casey, *NextGen Innovations, LLC v. Fujitsu Network Communications, Inc*, Case No. 2:22-cv-00307-JRG-RSP, 53 pp. (Feb. 2, 2023).

'Defendants' Appendix A-47—Invalidity claim chart for '181 in view of Fujimori, *NextGen Innovations, LLC v. Fujitsu Network Communications, Inc*, Case No. 2:22-cv-00307-JRG-RSP, 75 pp. (Feb. 2, 2023).

'Defendants' Appendix A-48—Invalidity claim chart for '181 in view of Gertel, *NextGen Innovations, LLC v. Fujitsu Network Communications, Inc*, Case No. 2:22-cv-00307-JRG-RSP, 73 pp. (Feb. 2, 2023).

'Defendants' Appendix A-49—Invalidity claim chart for '181 in view of Hietala, *NextGen Innovations, LLC v. Fujitsu Network Communications, Inc*, Case No. 2:22-cv-00307-JRG-RSP, 82 pp. (Feb. 2, 2023).

'Defendants' Appendix A-50—Invalidity claim chart for '181 in view of Koh, *NextGen Innovations, LLC v. Fujitsu Network Communications, Inc*, Case No. 2:22-cv-00307-JRG-RSP, 96 pp. (Feb. 2, 2023).

'Defendants' Appendix A-51—Invalidity claim chart for '181 in view of Nobuyuki, *NextGen Innovations, LLC v. Fujitsu Network Communications, Inc*, Case No. 2:22-cv-00307-JRG-RSP, 70 pp. (Feb. 2, 2023).

'Defendants' Appendix A-52—Invalidity claim chart for '181 in view of Otobe, *NextGen Innovations, LLC v. Fujitsu Network Communications, Inc*, Case No. 2:22-cv-00307-JRG-RSP, 75 pp. (Feb. 2, 2023).

'Defendants' Appendix A-53—Invalidity claim chart for '181 in view of Poplawski '558, *NextGen Innovations, LLC v. Fujitsu Network Communications, Inc*, Case No. 2:22-cv-00307-JRG-RSP, 90 pp. (Feb. 2, 2023).

'Defendants' Appendix A-54—Invalidity claim chart for '181 in view of Raghavan '904, *NextGen Innovations, LLC v. Fujitsu Network Communications, Inc*, Case No. 2:22-cv-00307-JRG-RSP, 78 pp. (Feb. 2, 2023).

'Defendants' Appendix A-55—Invalidity claim chart for '181 in view of Rowan, *NextGen Innovations, LLC v. Fujitsu Network Communications, Inc*, Case No. 2:22-cv-00307-JRG-RSP, 75 pp (Feb. 2, 2023).

'Defendants' Appendix A-56—Invalidity claim chart for '181 in view of Shinobu, *NextGen Innovations, LLC v. Fujitsu Network Communications, Inc*, Case No. 2:22-cv-00307-JRG-RSP, 111 pp. (Feb. 2, 2023).

'Defendants' Appendix A-57—Invalidity claim chart for '181 in view of Unitt, *NextGen Innovations, LLC v. Fujitsu Network Communications, Inc*, Case No. 2:22-cv-00307-JRG-RSP, 67 pp. (Feb. 2, 2023).

'Defendants' Appendix A-58—Invalidity claim chart for '181 in view of Wei, *NextGen Innovations, LLC v. Fujitsu Network Communications, Inc*, Case No. 2:22-cv-00307-JRG-RSP, 80 pp. (Feb. 2, 2023).

'Defendants' Appendix A-59—Invalidity claim chart for '181 in view of Graves, *NextGen Innovations, LLC v. Fujitsu Network Communications, Inc*, Case No. 2:22-cv-00307-JRG-RSP, 81 pp. (Feb. 2, 2023).

'Defendants' Appendix A-60—Invalidity claim chart for '181 in view of Levinson, *NextGen Innovations, LLC v. Fujitsu Network Communications, Inc*, Case No. 2:22-cv-00307-JRG-RSP, 64 pp. (Feb. 2, 2023).

'Defendants' Appendix A-61—Invalidity claim chart for '181 in view of Weber, *NextGen Innovations, LLC v. Fujitsu Network Communications, Inc*, Case No. 2:22-cv-00307-JRG-RSP, 78 pp. (Feb. 2, 2023).

'Defendants' Appendix A-62—Invalidity claim chart for '181 in view of Shi, *NextGen Innovations, LLC v. Fujitsu Network Communications, Inc*, Case No. 2:22-cv-00307-JRG-RSP, 60 pp. (Feb. 2, 2023).

'Defendants' Appendix A-63—Invalidity claim chart for '181 in view of Richard, *NextGen Innovations, LLC v. Fujitsu Network Communications, Inc*, Case No. 2:22-cv-00307-JRG-RSP, 50 pp. (Feb. 2, 2023).

'Defendants' Appendix A-64—Invalidity claim chart for '181 in view of Xu, *NextGen Innovations, LLC v. Fujitsu Network Communications, Inc*, Case No. 2:22-cv-00307-JRG-RSP, 42 pp. (Feb. 2, 2023).

'Defendants' Appendix A-65—Invalidity claim chart for '181 in view of Swenson, *NextGen Innovations, LLC v. Fujitsu Network Communications, Inc*, Case No. 2:22-cv-00307-JRG-RSP, 50 pp. (Feb. 2, 2023).

'Defendants' Appendix A-66—Invalidity claim chart for '181 in view of CAI, *NextGen Innovations, LLC v. Fujitsu Network Communications, Inc*, Case No. 2:22-cv-00307-JRG-RSP, 40 pp. (Feb. 2, 2023).

'Defendants' Appendix A-67—Invalidity claim chart for '181 in view of Liu, *NextGen Innovations, LLC v. Fujitsu Network Communications, Inc*, Case No. 2:22-cv-00307-JRG-RSP, 36 pp. (Feb. 2, 2023).

'Defendants' Appendix A-68—Invalidity claim chart for '181 in view of Zanoni, *NextGen Innovations, LLC v. Fujitsu Network Communications, Inc*, Case No. 2:22-cv-00307-JRG-RSP, 67 pp. (Feb. 2, 2023).

'Defendants' Appendix A-69—Invalidity claim chart for '181 in view of Hudgins, *NextGen Innovations, LLC v. Fujitsu Network Communications, Inc*, Case No. 2:22-cv-00307-JRG-RSP, 58 pp. (Feb. 2, 2023).

'Defendants' Appendix B-Combination, *NextGen Innovations, LLC v. Fujitsu Network Communications, Inc*, Case No. 2:22-cv-00307-JRG-RSP, 23 pp. (Feb. 2, 2023).

'Defendants' Appendix B-01—Invalidity claim chart for '723 in view of Agazzi '640, *NextGen Innovations, LLC v. Fujitsu Network Communications, Inc*, Case No. 2:22-cv-00307-JRG-RSP, 156 pp. (Feb. 2, 2023).

'Defendants' Appendix B-02—Invalidity claim chart for '723 in view of Aronson, *NextGen Innovations, LLC v. Fujitsu Network Communications, Inc*, Case No. 2:22-cv-00307-JRG-RSP, 39 pp. (Feb. 2, 2023).

'Defendants' Appendix B-03—Invalidity claim chart for '723 in view of Azadet, *NextGen Innovations, LLC v. Fujitsu Network Communications, Inc*, Case No. 2:22-cv-00307-JRG-RSP, 61 pp. (Feb. 2, 2023).

'Defendants' Appendix B-04—Invalidity claim chart for '723 in view of CAI, *NextGen Innovations, LLC v. Fujitsu Network Communications, Inc*, Case No. 2:22-cv-00307-JRG-RSP, 78 pp. (Feb. 2, 2023).

'Defendants' Appendix B-05—Invalidity claim chart for '723 in view of Feldman, *NextGen Innovations, LLC v. Fujitsu Network Communications, Inc*, Case No. 2:22-cv-00307-JRG-RSP, 32 pp. (Feb. 2, 2023).

'Defendants' Appendix B-06—Invalidity claim chart for '723 in view of Fisher, *NextGen Innovations, LLC v. Fujitsu Network Communications, Inc*, Case No. 2:22-cv-00307-JRG-RSP, 26 pp. (Feb. 2, 2023).

'Defendants' Appendix B-07—Invalidity claim chart for '723 in view of Hidai, *NextGen Innovations, LLC v. Fujitsu Network Communications, Inc*, Case No. 2:22-cv-00307-JRG-RSP, 32 pp. (Feb. 2, 2023).

'Defendants' Appendix B-08—Invalidity claim chart for '723 in view of Ho, *NextGen Innovations, LLC v. Fujitsu Network Communications, Inc*, Case No. 2:22-cv-00307-JRG-RSP, 47 pp. (Feb. 2, 2023).

\* cited by examiner

SYSTEM AND METHOD FOR PERFORMING HIGH-SPEED COMMUNICATIONS OVER FIBER OPTICAL NETWORKS

CROSS-REFERENCE TO RELATED APPLICATIONS

This application is filed as a 37 C.F.R. 1.53(b) as a continuation claiming the benefit under 35 U.S.C § 120 of the pending U.S. patent application Ser. No. 17/013,635, "System and Method for Performing High-Speed Communications over Fiber Optical Networks", which was filed by the same inventors on Sep. 6, 2020 claiming the benefit under 35 U.S.C § 120 of the pending U.S. patent application Ser. No. 16/297,610, "System and Method for Performing High-Speed Communications over Fiber Optical Networks", which was filed by the same inventors on Mar. 9, 2019 claiming the benefit under 35 U.S.C § 120 of the pending U.S. patent application Ser. No. 15/884,351, "System and Method for Performing High-Speed Communications over Fiber Optical Networks", which was filed by the same inventors on Jan. 30, 2018 claiming the benefit under 35 U.S.C § 120 of the pending U.S. patent application Ser. No. 15/095,137, "System and Method for Performing High-Speed Communications over Fiber Optical Networks", which was filed by the same inventors on Apr. 10, 2016, now U.S. Pat. No. 9,887,795, claiming the benefit under 35 U.S.C § 120 of the pending U.S. patent application Ser. No. 12/512,968, "System and Method for Performing High-Speed Communications over Fiber Optical Networks", which was filed by the same inventors on Jul. 30, 2009, now U.S. Pat. No. 9,337,948, claiming the benefit under 37 C.F.R. 1.53(b)(2) of U.S. patent application Ser. No. 11/772,187 filed on Jun. 30, 2007, which claims benefit of commonly-assigned U.S. patent application Ser. No. 10/865,547 filed on Jun. 10, 2004, now U.S. Pat. No. 7,242,868, which claims the benefit of U.S. Provisional Application No. 60/477,845 filed Jun. 10, 2003, incorporated herein by reference, and U.S. Provisional Application No. 60/480,488 filed Jun. 21, 2003, incorporated herein by reference.

FIELD OF THE INVENTION

The invention relates to optical fiber communications generally, and more specifically to m-ary modulation in optical communication networks.

BACKGROUND OF THE INVENTION

Line coding is a process by which a communication protocol arranges symbols that represent binary data in a particular pattern for transmission. Conventional line coding used in fiber optic communications includes non-return-to-zero (NRZ), return-to-zero (RZ), and biphase, or Manchester. The binary bit stream derived from these line codes can be directly modulated onto wavelengths of light generated by the resonating frequency of a laser. Traditionally direct binary modulation based transmission offers an advantage with regard to the acceptable signal-to-noise ratio (SNR) at the optical receiver, which is one of the reasons direct binary modulation methods are used in the Datacom Ethernet/IP, Storage Fiber-Channel/FC and Telecom SONET/SDH markets for transmission across nonmultiplexed unidirectional fiber links.

The performance of a fiber optic network can be measured by the maximum data throughput rate (or information carrying capacity) and the maximum distance between source and destination achievable (or reach). For Passive Optical Networks (PONs) in particular, additional measures of performance are the maximum number of Optical Networking Units (ONUs) and/or Optical Networking Terminals (ONTs) possible on a network and the minimum and maximum distance between the Optical Line Terminator (OLT) and an ONU/ONT. These performance metrics are constrained by, among other things, amplitude degradation and temporal distortions as a result of light traveling through an optical fiber.

Amplitude degradation is substantially a function of length or distance between two end points of an optical fiber. Temporal distortion mechanisms include intramodal (chromatic) dispersion and intermodal (modal) dispersion. Intramodal dispersion is the dominant temporal dispersion on Single-mode fiber (SMF), while intermodal dispersion is dominant on Multi-mode fiber (MMF). Both types of temporal distortions are measured as functions of frequency or rate of transmission (also referred as line rate of a communication protocol) over distance in MHz·km. Temporal distortions are greater, hence a constraint on network performance, with increasing frequency transmission.

SUMMARY OF THE INVENTION

In general, in one aspect, the invention includes a method for processing a received optical signal in an optical communication network, the method including: determining a first set of coefficients to equalize a portion of an optical signal received over a first optical link including using a blind equalization method that does not use a known training sequence to equalize the portion of the optical signal, equalizing the portion of the optical signal using the determined coefficients, and demodulating the equalized portion of the optical signal according to an m-ary modulation format.

Aspects of the invention may include one or more of the following features. The method includes determining a second set of coefficients to equalize a portion of an optical signal received over a second optical link. The method includes selecting one of the first or second set of coefficients based on a source of the portion of optical signal being equalized. The portion of the optical signal includes a burst within a time slot of the first optical link. The method includes storing the determined coefficients. The method includes retrieving the stored coefficients for equalizing a second portion of the optical signal corresponding to a portion received from a same source as generated the first portion of the optical signal. The coefficients are retrieved between signal bursts on the first optical link. The stored coefficients are retrieved for respective portions of the optical signals that correspond to respective signal sources. The first optical link includes a link in a point-to-multipoint passive optical network. The m-ary modulation format is selected from the group consisting of quadrature amplitude modulation, quadrature phase shift keying, orthogonal frequency division multiplexing and pulse amplitude modulation. The method includes demodulating a received first data stream and demodulating a second data stream received in the optical signal, and multiplexing the first and second data streams.

In general, in another aspect, the invention includes optical communication system including: a first transceiver coupled by an optical network to a second transceiver and third transceiver, the first transceiver including an equalization block and a modulation block, the equalization block operable to determine a first set of coefficients to equalize a portion of an optical signal received over the optical network from the second transceiver and a second set of coefficients to equalize a portion of the optical signal received over the optical network from the third transceiver, the equalization block including a blind equalization routine that does not use a known training sequence to equalize the portions of the optical signal, the equalization block operable to equalize the portions of the optical signal using the determined coefficients, and the modulation block operable to demodulate equalized portions of the optical signal according to an m-ary modulation format.

Aspects of the invention may include one or more of the following features. The optical network includes a first optical link for coupling the first and second transceiver, and a second optical link for coupling the first and third transceivers and where the equalization block is operable to select one of the first or second set of coefficients based on a source of the portion of optical signal being equalized. The equalization block is operable to store the first and second sets of coefficients for later retrieval and use to equalize portions of the optical signal. The portion of the optical signal includes a burst within a time slot on the optical network. The equalization block is operable to retrieve the sets of coefficients between signal bursts on the optical network. The optical network includes a link in a point-to-multipoint passive optical network. The m-ary modulation format is selected from the group consisting of quadrature amplitude modulation, quadrature phase shift keying, orthogonal frequency division multiplexing and pulse amplitude modulation. The system includes a multiplexer, the modulation block operable to demodulating a received first data stream and a second data stream received in the optical signal, and the multiplexer operable to multiplex the first and second data streams. The system includes a transmission convergence layer block for processing data streams received by the first transceiver, the transmission convergence layer block operable to control the demultiplexing of data streams including control of the multiplexer. The optical network is an optical distribution network. The first transceiver is an optical line terminator. The second and third transceivers are optical network terminals or optical network units.

In general, in another aspect, the invention includes a method for processing data for transmission in an optical communication network, the method including: demultiplexing a data stream into a first demultiplexed data stream and a second demultiplexed data stream, modulating each of the first and second data streams according to an m-ary modulation format, transmitting the first modulated data stream over a first optical link; and transmitting the second modulated data stream over a second optical link.

In general, in another aspect, the invention includes an optical communication system including: a demultiplexer operable to demultiplex a data stream into a first demultiplexed data stream and a second demultiplexed data stream, a modulation block operable to modulate each of the first and second data streams according to an m-ary modulation format, transmitting means operable to transmit the first modulated data stream over a first optical link and the second modulated data stream over a second optical link.

In general, in another aspect, the invention includes a method for processing a received optical signal in an optical communication network, the method including: equalizing a received optical signal to provide an equalized signal, demodulating the equalized signal according to an m-ary modulation format to provide a demodulated signal, decoding the demodulated signal according to an inner code to provide an inner-decoded signal, and decoding the inner-decoded signal according to an outer code.

Aspects of the invention may include one or more of the following features. The m-ary modulation format is selected from the group consisting of quadrature amplitude modulation, quadrature phase shift keying, orthogonal frequency division multiplexing and pulse amplitude modulation. Equalizing the received optical signal includes equalizing the received optical signal using a blind equalization routine that does not use a known training sequence. Equalizing the received optical signal includes equalizing the received optical signal using a known training sequence. The known training sequence is multiplexed in a frame within the received optical signal. The inner code includes a trellis code. The outer code includes an error correction code. The outer code includes a: Reed-Solomon code; trellis code; Low-density parity-check code, or a Turbo code.

In general, in another aspect, the invention includes a transceiver including: an equalizer for equalizing a received optical signal to provide an equalized signal, a demodulator in communication with the equalizer for demodulating the equalized signal according to an m-ary modulation format to provide a demodulated signal, an inner-decoder in communication with the demodulator for decoding the demodulated signal according to an inner code to provide an inner-decoded signal, and an outer-decoder in communication with the inner-decoder for decoding the inner-decoded signal according to an outer code.

Aspects of the invention may include one or more of the following features. The transceiver includes an optical module including a first bi-directional optical fiber interface including a first detector and a first driver, and a second bi-directional optical fiber interface including a second detector and a second driver, and management means for managing data flow across the first bi-directional optical fiber interface and across the second bi-directional optical fiber interface. The transceiver includes an optical module including a first bi-directional optical fiber interface including a first detector and a first driver, and a second bi-directional optical fiber interface including a second detector and a second driver, and a multiplexer for multiplexing a first demultiplexed data stream received over the first bi-directional optical fiber interface and a second demultiplexed data stream received over the second bi-directional optical fiber interface into a multiplexed data stream for transmission. The transceiver includes an optical module including a first bi-directional optical fiber interface including a first detector and a first driver, and a second bi-directional optical fiber interface including a second detector and a second driver, and a queue manager for managing traffic for a first bi-directional link associated with the first bi-directional optical fiber interface independently from traffic for a second bi-directional link associated with the second bi-directional optical fiber interface.

In general, in another aspect, the invention includes a transceiver including: an optical module including a first bi-directional optical fiber interface including a first detector and a first driver, and a second bi-directional optical fiber interface including a second detector and a second driver, and management means for managing data flow across the first bi-directional optical fiber interface and across the second bi-directional optical fiber interface.

Aspects of the invention may include one or more of the following features. The management means includes a multiplexer for multiplexing a first demultiplexed data stream received over the first bi-directional optical fiber interface and a second demultiplexed data stream received over the second bi-directional optical fiber interface into a multiplexed data stream for transmission. The management means is configured to demultiplex a data stream over a plurality of fiber links that excludes one or more failed fiber links. The management means includes a queue manager for managing traffic across the first bi-directional fiber interface independently from traffic for the second bi-directional fiber interface. The management means is configured to change the alignment of received data bits to adjust for an order of optical fiber connections to the first bi-directional optical fiber interface and the second bi-directional optical fiber interface.

In general, in another aspect, the invention includes a method for equalizing an optical channel including: storing channel characteristics for the optical channel associated with a client, loading the stored channel characteristics during a waiting period between bursts on the channel, and equalizing a received burst from the client using the loaded channel characteristics.

Aspects of the invention may include one or more of the following features. The method includes determining that the waiting period occurs before a burst from the client based on a schedule. The method includes updating the stored channel characteristics. The method includes providing a grant window, transmitting an identification number to the client in response to receiving a serial number from the client after the grant window. The method includes determining a distance from an upstream device to the client. The method includes compensating for communication delays between the upstream device and the client based on the determined distance.

In general, in another aspect, the invention includes a method for communicating data on a fiber optic network, the method including: modulating and demodulating data traffic on an optical link in the network in an m-ary modulation format; encoding and decoding data traffic on an optical link in the network according to an inner coding routine and an outer coding routine, demultiplexing data traffic from an optical link in the network and transmitting the data traffic across a plurality of optical fiber links in the network, multiplexing the data traffic from the plurality of optical fiber links, and equalizing a receive channel in the network to remove temporal distortions.

Aspects of the invention may include one or more of the following features. The method includes equalizing the receive channel according to a blind equalization routine. The method includes equalizing the receive channel according to a decision directed equalization routine. The method includes saving and loading coefficients for equalizing the receive channel for each of a plurality of transmitting sources. The method includes conveying a training sequence for a decision directed equalization routine as part of an in-use communication protocol. A training sequence for a decision directed equalization routine is conveyed as part of the activation process for an optical network terminal or optical network unit. An incorrect connection of an optical fiber link is corrected without having to physically change the connection.

In general, in another aspect, the invention includes a method for communicating on a passive optical network between a central transmission point and a plurality of receiving client end points, the method including: preparing downstream data for transmission and transmitting an optical downstream continuous mode signal demultiplexed across a plurality of bi-directional fibers using a plurality of wavelengths of light, receiving an optical downstream continuous mode signal demultiplexed from the plurality of bi-directional fibers using the plurality of wavelengths of light and recovering a downstream data transmission, preparing upstream data for transmission and transmitting an optical upstream burst mode signal demultiplexed across the plurality of bi-directional fibers using the plurality of wavelengths of light, and receiving an optical burst mode signal demultiplexed from the plurality of bi-directional fibers using the plurality of wavelengths of light and recovering an upstream data transmission.

Aspects of the invention may include one or more of the following features. The central transmission point includes an optical line terminal, and the end points are operative as transceivers in a passive optical network. The upstream and downstream data for transmission are conveyed by respective different industry-standard services.

Implementations of the invention may include one or more of the following advantages.

A system is proposed that provides for high-speed communications over fiber optic networks. The system may include the use of the one or more of the following techniques either individually or in combination: m-ary modulation; channel equalization; demultiplexing across multiple fibers, coding and error correction. M-ary modulation allows for increased data throughput for a given line rate due to an increase in the number of bits per symbol transmitted. Channel equalization reduces the effects of temporal distortions allowing for increased reach. Demultiplexing across multiple fibers allows lower lines rates for a given data throughput rate due to the increased aggregate data throughput from the multiplexing. Coding and error correction allows for a greater selection of qualifying optical components that can be used in the network and complements m-ary modulation and channel equalization for overall system performance improvement as measured by transmit energy per bit. These methods when combined (in part or in total) increase the data throughput and reach for fiber optic networks. For PONs in particular, these methods may increase the number of ONU/ONTs and the distance between OLT and ONU/ONT by decreasing the line rate as compared to a conventional communication system of equivalent data throughput.

DETAILED DESCRIPTION

Figure 1:
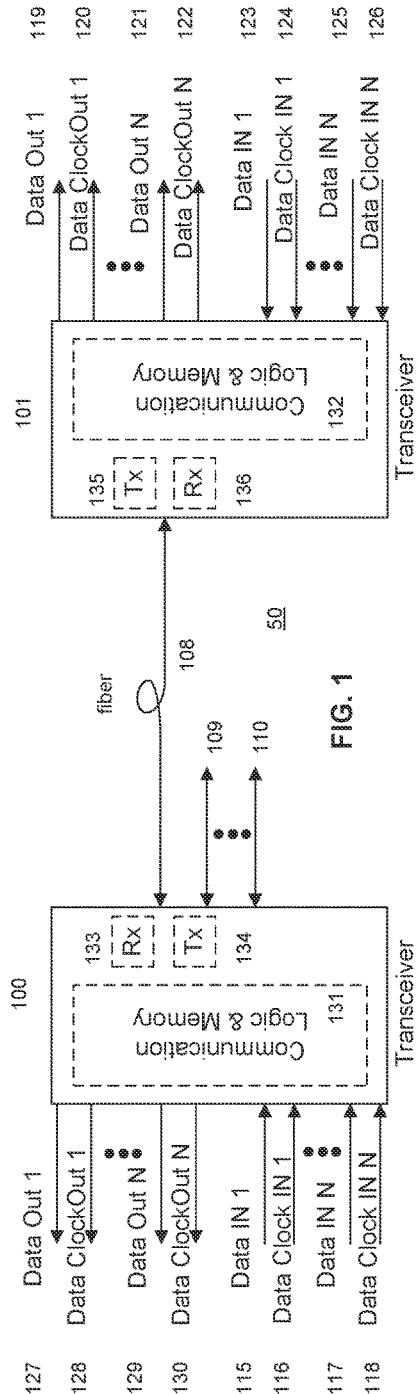
FIG. 1 illustrates a fiber optic data network.

Referring to FIG. 1, wherein like reference numerals designate identical or corresponding parts throughout the several views and embodiments, a high-level fiber optic data network 50 includes a first transceiver 100 in communication with a second transceiver 101 via a fiber 108. The first transceiver 100 and the second transceiver 101 include transmitter circuitry (Tx) 134, 135 to convert electrical data input signals into modulated light signals for transmission over the fiber 108. In addition, the first transceiver 100 and the second transceiver 101 also include receiver circuitry (Rx) 133, 136 to convert optical signals received via the fiber 108 into electrical signals and to detect and recover encoded data and/or clock signals. First transceiver 100 and second transceiver 101 may contain a micro controller (not shown) and/or other communication logic and memory 131, 132 for network protocol operation. Although the illustrated and described implementations of the transceivers 100, 101 include communication logic and memory in a same package or device as the transmitter circuitry 134, 135 and receiver circuitry 133, 136, other transceiver configurations may also be used.

First transceiver 100 transmits/receives data to/from the second transceiver 101 in the form of modulated optical light signals of known wavelength via the optical fiber 108. The transmission mode of the data sent over the optical fiber 108 may be continuous, burst or both burst and continuous modes. Both transceivers 100, 101 may transmit a same wavelength (e.g., the light signals are polarized and the polarization of light transmitted from one of the transceivers is perpendicular to the polarization of the light transmitted by the other transceiver). Alternatively, a single wavelength can be used by both transceivers 100, 101 (e.g., the transmissions can be made in accordance with a time-division multiplexing scheme or similar protocol).

In another implementation, wavelength-division multiplexing (WDM) may also be used. WDM is herein defined as any technique by which two optical signals having different wavelengths may be simultaneously transmitted bi-directionally with one wavelength used in each direction over a single fiber. In yet another implementation, coarse wavelength-division multiplexing (CWDM) or dense wavelength-division multiplexing (DWDM) may be used. CWDM and DWDM are herein defined as any technique by which two or more optical signals having different wavelengths are simultaneously transmitted in the same direction. The difference between CWDM and DWDM is CWDM wavelengths are typically spaced 20 nanometers (nm) apart, compared with 0.4 nm spacing for DWDM wavelengths. Both CWDM and DWDM may be used in bi-directional communications. In bi-directional communications, e.g. if wavelength-division multiplexing (WDM) is used, the first transceiver 100 may transmit data to the second transceiver 101 utilizing a first wavelength of modulated light conveyed via the fiber 108 and, similarly, the second transceiver 101 may transmit data via the same fiber 108 to the first transceiver 100 utilizing a second wavelength of modulated light conveyed via the same fiber 108. Because only a single fiber is used, this type of transmission system is commonly referred to as a bi-directional transmission system. Although the fiber optic network illustrated in FIG. 1 includes a first transceiver 100 in communication with a second transceiver 101 via a single fiber 108, other implementations of fiber optic networks, such as those having a first transceiver in communication with a plurality of transceivers via a plurality of fibers (e.g. shown in FIG. 2), may also be used.

Electrical data input signals (Data IN 1) 115, as well as any optional clock signal (Data Clock IN 1) 116, are routed to the transceiver 100 from an external data source (not shown) for processing by the communication logic and memory 131. Communication logic and memory 131 process the data and clock signals in accordance with an in-use network protocol. Communication logic and memory 131, 132 provides management functions for received and transmitted data including queue management (e.g., independent link control) for each respective link, demultiplexing/multiplexing and other functions as described further below. The processed signals are transmitted by the transmitter circuitry 134. The resulting modulated light signals produced from the first transceiver's 100 transmitter 134 are then conveyed to the second transceiver 101 via the fiber 108. The second transceiver 101, in turn, receives the modulated light signals via the receiver circuitry 136, converts the light signals to electrical signals, processes the electrical signals using the communication logic and memory 132 (in accordance with an in-use network protocol) and, optionally, outputs the electrical data output signals (Data Out 1) 119, as well as optional clock signals (Data Clock Out 1) 120.

Similarly, the second transceiver 101 receives electrical data input signals (Data IN 1) 123, as well as any optional clock signals (Data Clock IN) 124, from an external data source (not shown) for processing by the communication logic and memory 132 and transmission by the transmitter circuitry 135. The resulting modulated light signals produced from the second transceiver's 101 transmitter 135 are then conveyed to the first transceiver 100 using the optical fiber 108. The first transceiver 100, in turn, receives the modulated light signals via the receiver circuitry 133, converts the light signals to electrical signals, processes the electrical signals using the communication logic and memory 131 (in accordance with an in-use network protocol), and, optionally, outputs the electrical data output signals (Data Out 1) 127, as well as any optional clock signals (Data Clock Out 1) 128.

Fiber optic data network 50 may also include a plurality of electrical input and clock input signals, denoted herein as Data IN N 117/125 and Data Clock IN N 118/126, respectively, and a plurality of electrical output and clock output signals, denoted herein as Data Out N 129/121 and Data Clock Out N 130/122, respectively. The information provided by the plurality of electrical input signals may or may not be used by a given transceiver to transmit information via the fiber 108 and, likewise, the information received via the fiber 108 by a given transceiver may or may not be outputted by the plurality of electrical output signals. The plurality of electrical signals denoted above can be combined to form data plane or control plane bus(es) for input and output signals respectively. In some implementations, the plurality of electrical data input signals and electrical data output signals are used by logic devices or other devices located outside (not shown) a given transceiver to communicate with the transceiver's communication logic and memory 131, 132, transmit circuitry 134, 135, and/or receive circuitry 133,136.

Figure 2:
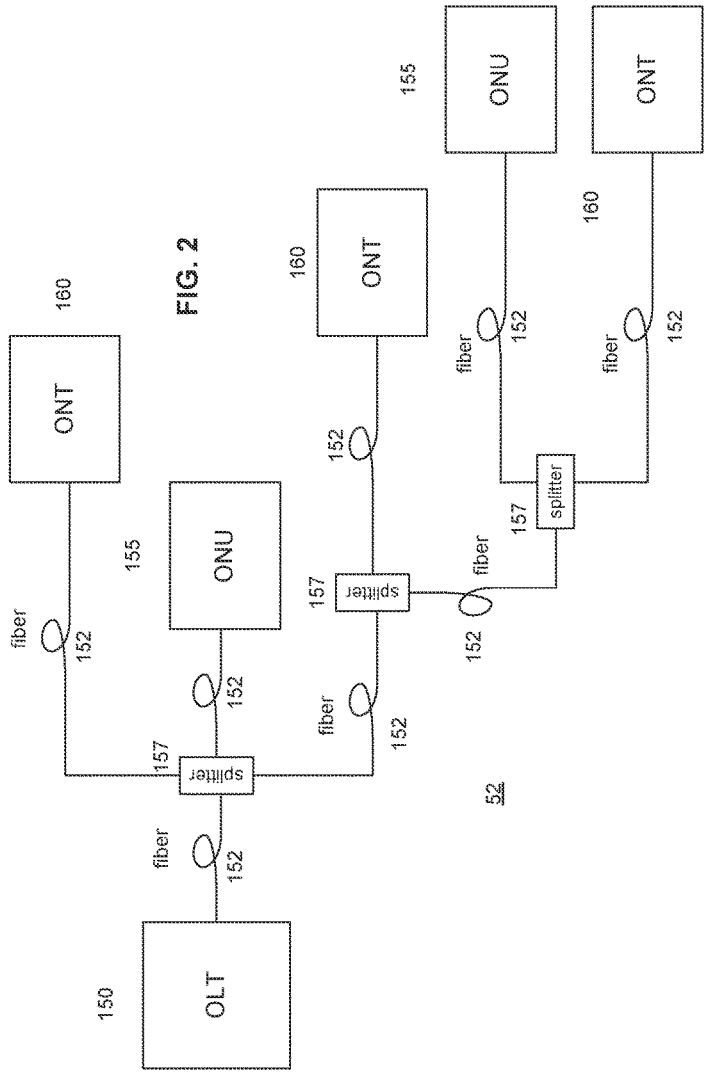
FIG. 2 illustrates a block diagram of a passive optical network.

FIG. 2 illustrates an implementation of a passive optical network (PON) 52, where the functions described above associated with the first transceiver 100 and the second transceiver 101 of FIG. 1, are implemented in an optical line terminator (OLT) 150 and one ore more optical networking units (ONU) 155, and/or optical networking terminals (ONT) 160, respectively. PON(s) 52 may be configured in either a point-to-point network architecture, wherein one OLT 150 is connected to one ONT 160 or ONU 155, or a point-to-multipoint network architecture, wherein one OLT 150 is connected to a plurality of ONT(s) 160 and/or ONU(s) 155. In the implementation shown in FIG. 2, an OLT 150 is in communication with multiple ONTs/ONUs 160, 155 via a plurality of optical fibers 152. The fiber 152 coupling the OLT 150 to the PON 52 is also coupled to other fibers 152 connecting the ONTs/ONUs 160, 155 by one or more passive optical splitters 157. All of the optical elements between an OLT and ONTs/ONUs are often referred to as the Optical Distribution Network (ODN). Other alternate network configurations, including alternate implementations of point-to-multipoint networks are also possible.

Figure 3:
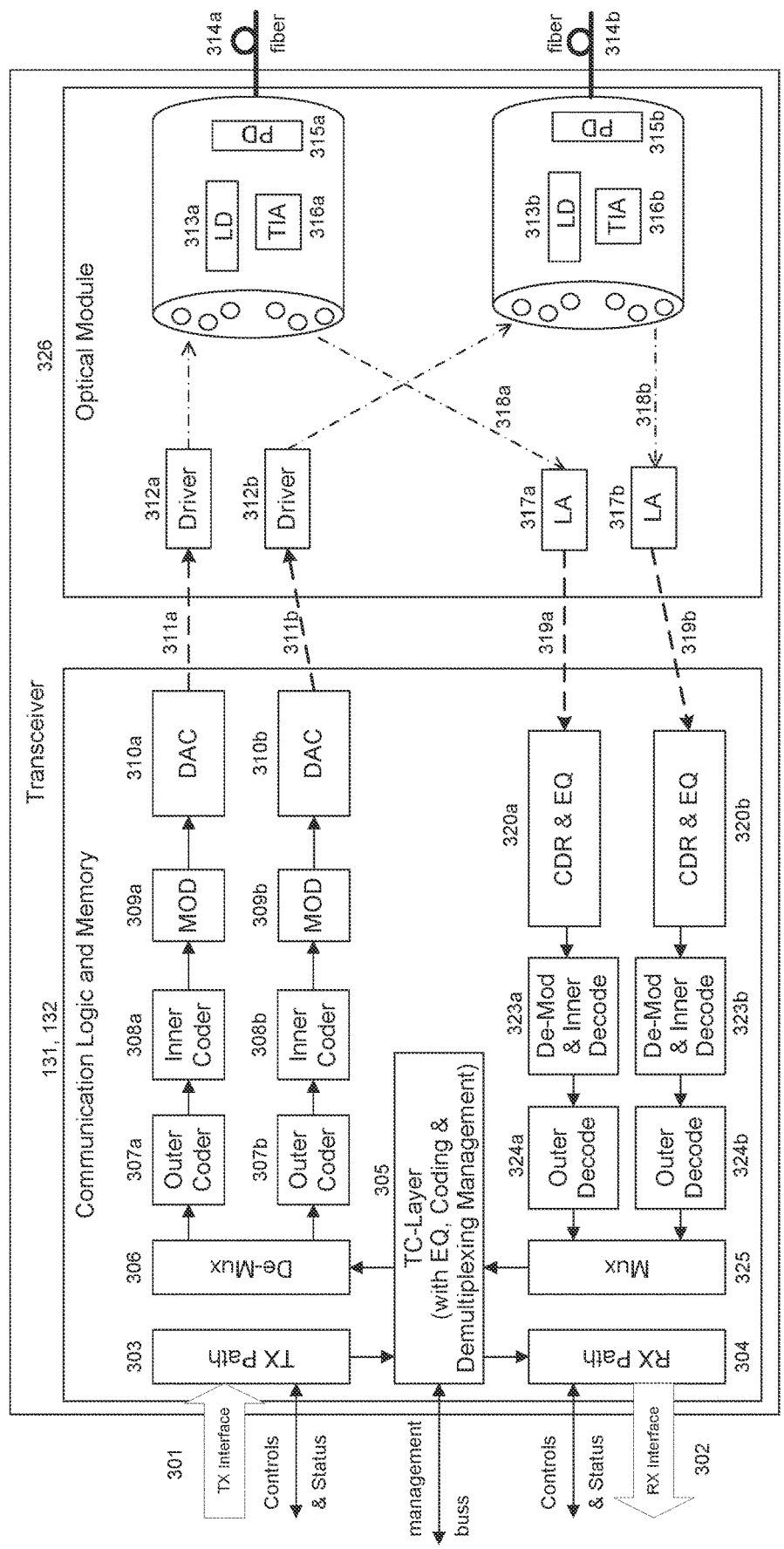
FIG. 3 illustrates a block diagram of a high-speed communication system for fiber optic networks.

FIG. 3 shows a system block diagram for an implementation of transceiver 100. It will be appreciated that, while not always shown, one or more elements or blocks in the following embodiments may be sealed in one or more faraday cages or combined with blocks in faraday cages already shown. It will also be appreciated that, while not shown, one or more elements or blocks in the following embodiments may be combined onto one or more integrated circuits (IC) or surface mount photonic (SMP) devices. The following is a description of the functions and responsibilities that are part of an implementation of the Communication Logic & Memory 131 of transceiver 100. The Communication Logic & Memory 131 includes an asynchronous or synchronous system transmit (TX) interface 301 and receive (RX) interface 302 that is supported by the TX Path 303 and RX Path 304 blocks. System interfaces 301,302 and management or control interfaces can be selected from conventional interfaces including serial, serial XFI, parallel, GMII, XGMII, SGMII, RGMII or XAUI or some other interface may be used. TX Path 303 and RX Path 304 blocks manage the TX and RX interfaces 301,302 and feed data into and get data from the transmission convergence layer or media access control (TC-Layer/MAC) block 305. TX Path 303 and RX Path 304 blocks may perform line code adaptation functions (e.g., line coding used outside the transceiver can be terminated by a TX Path block 303 or sourced by a RX Path block 304 to allow a bit stream, cell, frame, and/or packet formatted data to be adapted for processing by a TC-Layer/MAC block 305). The TC-Layer/MAC 305 block creates the transport system that the data traffic, management and control agents will exploit. TC-Layer/MAC 305 block includes a TC-layer protocol stack such as specified in the ITU G.984 specification (incorporated herein by reference), IEEE 802.3ah MAC protocol stack specification (incorporated herein by reference) or a derivative thereof. A variety of other protocol stacks may also be used. The TC-Layer/MAC 305 block may perform the additional functions of equalizer, coding, queue and demultiplexing management. The TC-Layer/MAC 305 block sends transmit data to a DeMux 306 block, which splits the transmitting data into a plurality of data paths (two paths shown in FIG. 3) for demultiplexing data across multiple fibers. Some implementations need not include DeMux 306 block (and hence do not support demultiplexing data across multiple fibers). DeMux 306 block may demultiplex data across a subset of fibers to exclude fibers experiencing link failure to ensure data communications continue. The exclusion of fiber links experiencing failure is controlled by the TC-Layer/MAC 305 block as part of the demultiplexing management function.

After DeMux 306 block, in one implementation, the transmit paths have analogous processing blocks. In an alternative implementation, independent signal processing can be supported in each path. FIG. 3 shows two transmit paths, though more can be included. In a transmit path, the transmit data is provided to the outer coder 307a, 307b block. In one implementation, outer coder 307a performs a reed-solomon coding. The outer coder 307a, 307b block provides data to the inner coder 308a, 308b block. In order to improve the energy per bit required to deliver the transmitting data, an inner coder 308a, 308b is used. Outer coder 307a, 307b may be used to support forward error correction (FEC) recovery of bit(s) errors. In one implementation, inner coder 308a, 308b implements a trellis coding method. Data from the inner coder 308a, 308b is provided to Modulation (MOD) 309a, 309b block. Alternatively, in some implementations, the outer coder 307a, 307b and inner coder 308a, 308b blocks are not used, and the output of the DeMux 306 block is provided directly to the MOD 309a, 309b block. Other outer coding methods that work on bit or symbol streams of arbitrary length can be used, for example linear block codes such as Low-density parity-check (LDPC) and convolutional codes such as Turbo code may be used. Other inner coding methods that are complementary to the outer code as well as inner coding methods that are designed to shape or control the relative intensity noise (RIN) of the optical transmitter to improve overall system performance may be used. For example, an inner coder that dynamically adapts to measured RIN or compensates for measured temperature or other artifacts of laser design may be used.

To increase the number of bits per symbol transmitted, m-ary modulation is performed in the MOD 309a, 309b block. In one implementation, an m-ary modulation method such as Quadrature Amplitude Modulation (QAM), QAM-32, QAM-256, Pulse Amplitude Modulation (PAM), PAM-5, PAM-17, Quadrature Phase Shift Keying (QPSK), differential QPSK (DQPSK), return-to-zero QPSK (RZ-QPSK), dual-polarized QPSK (DP-QPSK), or Orthogonal Frequency Division Multiplexing (OFDM) is used. Other m-ary modulation communication methods can be used, in particular other coherent modulation techniques which are known in the art. After processing by the MOD 309a, 309b block, the transmit data is converted to an analog signal by a Digital to Analog Converter (DAC) 310a, 310b. In one implementation, DAC 310a, 310b is configured to shape, condition or emphasize the signal for improved transmission performance. The DAC 310a, 310b passes the transmit data via electrical signals 311a, 311b to the laser driver (Driver) 312a, 312b as part of an implementation of TX 134 in an Optical Module 326. The driver 312a, 312b drives an optical transmitter, such as the Laser Diode (LD) 313a, 313b, which transmits light in response to transmit data signals received from the driver 312a, 312b. The light emitted from LD 313a, 313b is directed into the fibers 314a, 314b with the aid of a fiber optic interface (not shown). The fiber optic interface may include the necessary components (e.g., filters) to implement WDM, CWDM or DWDM functions.

On the receive side of the transceiver 100 as part of an implementation of RX 133 in an Optical Module 326, light propagated across an ODN (not shown in FIG. 3) travels over fibers 314a, 314b through a fiber optic interface (not shown) and is received by an optical detector, such as the photo diode (PD) 315a, 315b. In response, the PD 315a, 315b provides a photocurrent to the TransImpedance Amplifier (TIA) 316a, 316b that converts the photocurrent into an electrical voltage signal. The electrical voltage signal from the TIA 316a, 316b is then transmitted to a Linear Amplifier (LA) 317a, 317b as a differential signal or a single-ended signal 318a, 318b. The LA 317a, 317b performs signal conditioning on the received electrical voltage signal to provide increased resolution and system performance. The LA 317a, 317b provides an electrical signal 319a, 319b to a Clock Data Recovery (CDR) and Equalization (EQ) 320a, 320b block that recovers clock and data signals and performs equalization on the received data, which is then provided to a De-Mod & Inner Decoder 323a, 323b. The CDR & EQ 320a, 320b block may implement a blind equalization method or decision-directed equalization method. Blind equalization is discussed further below. Other equalization methods may be used, particularly those that aid the CDR. The De-Mod & Inner Decoder 323a, 323b block performs complementary de-modulation to the m-ary modulation performed in the MOD 309a, 309b block as well as a complementary decoding method to the coding method performed in the Inner Coder 308a, 308b block. In one implementation, De-Mod & Inner Decoder 323a, 323b includes a Viterbi decoder. Other decoding means may be used. Received data is then provided to the outer decoder 324a, 324b block, which performs a complementary decode to the error detection and/or recovery method chosen in the outer coder 307a, 307b block. After demodulation and decoding, the received data is then provided to the Mux 325 block that performs a complementary function to the DeMux 306 block. The combined received data is then provided to the TC-Layer/MAC 305. In implementations without Outer Coder 307a, 307b and Inner Coder 308a, 308b blocks, the output of the CDR & EQ 320a, 320b block is provided directly to the Mux 325 block.

The RX 133,136 and TX 134,135 circuitry of transceivers 100,101, or portions thereof, for example, PD 315a, 315b and LA 317a, 317b, can be combined within industry standard optical modules. Common optical module standards are 300pin, XENPAK, X2, and XPAK transponders and XFP or SFP and SFP+ transceivers. These optical modules include unidirectional fiber links with one fiber link for transmit path and a second fiber link for the receive path. However, implementations of optical modules 326, 401, 501 incorporate a plurality of bi-directional fiber links for transmitting demultiplexed data on separate fiber links. Any of a variety of optical couplers may be used to separate and/or combine light propagating into or out of the fiber links. These optical modules 326, 401, 501 used herein can conform to a form factor of standard optical modules such as the 300pin, XENPAK, X2, XPAK, XFP or SFP and SFP+. Other form factors may also be used.

Figure 4:
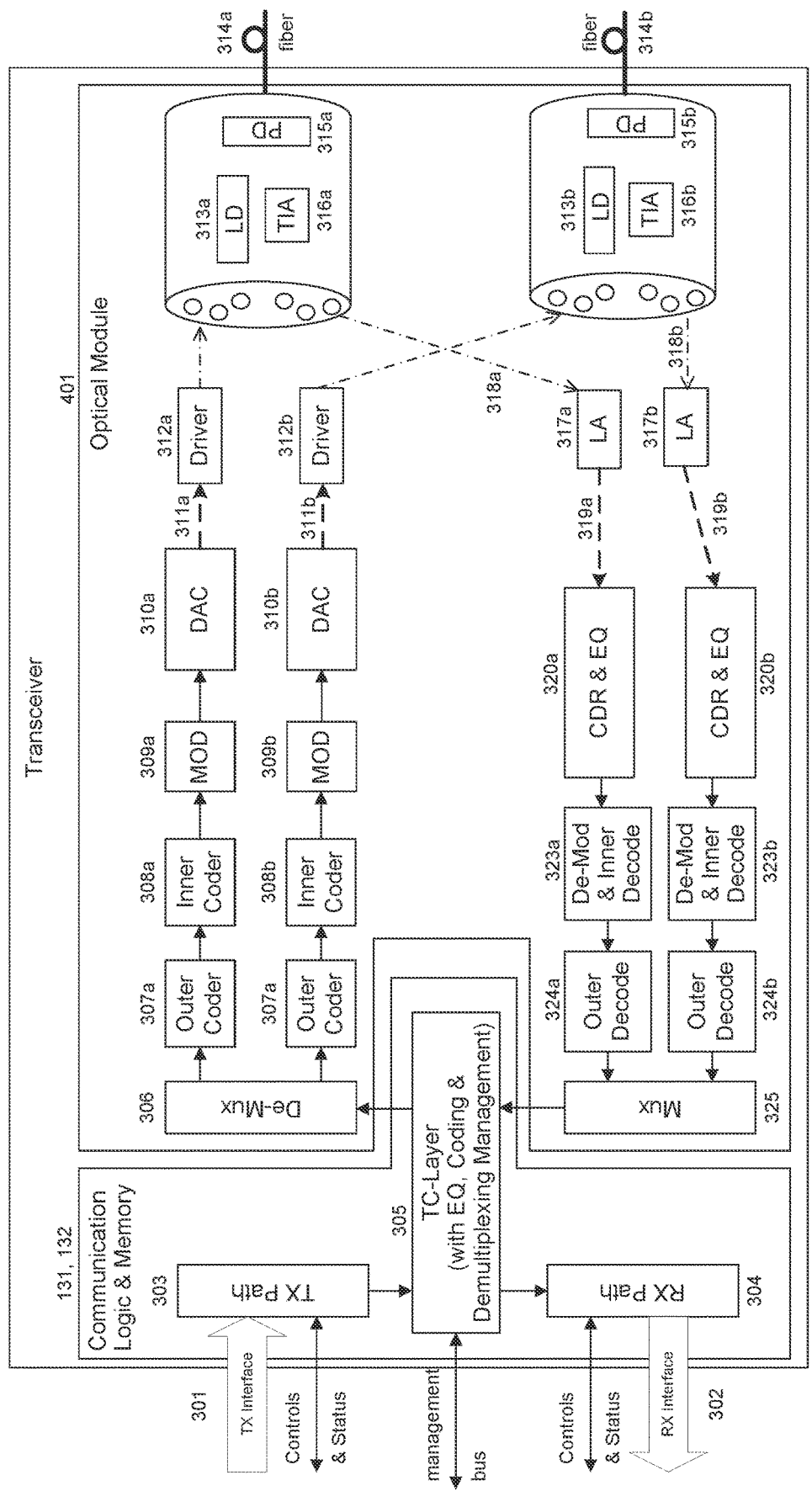
FIG. 4 illustrates a block diagram of an alternative high-speed communication system for fiber optic networks.
Figure 5:
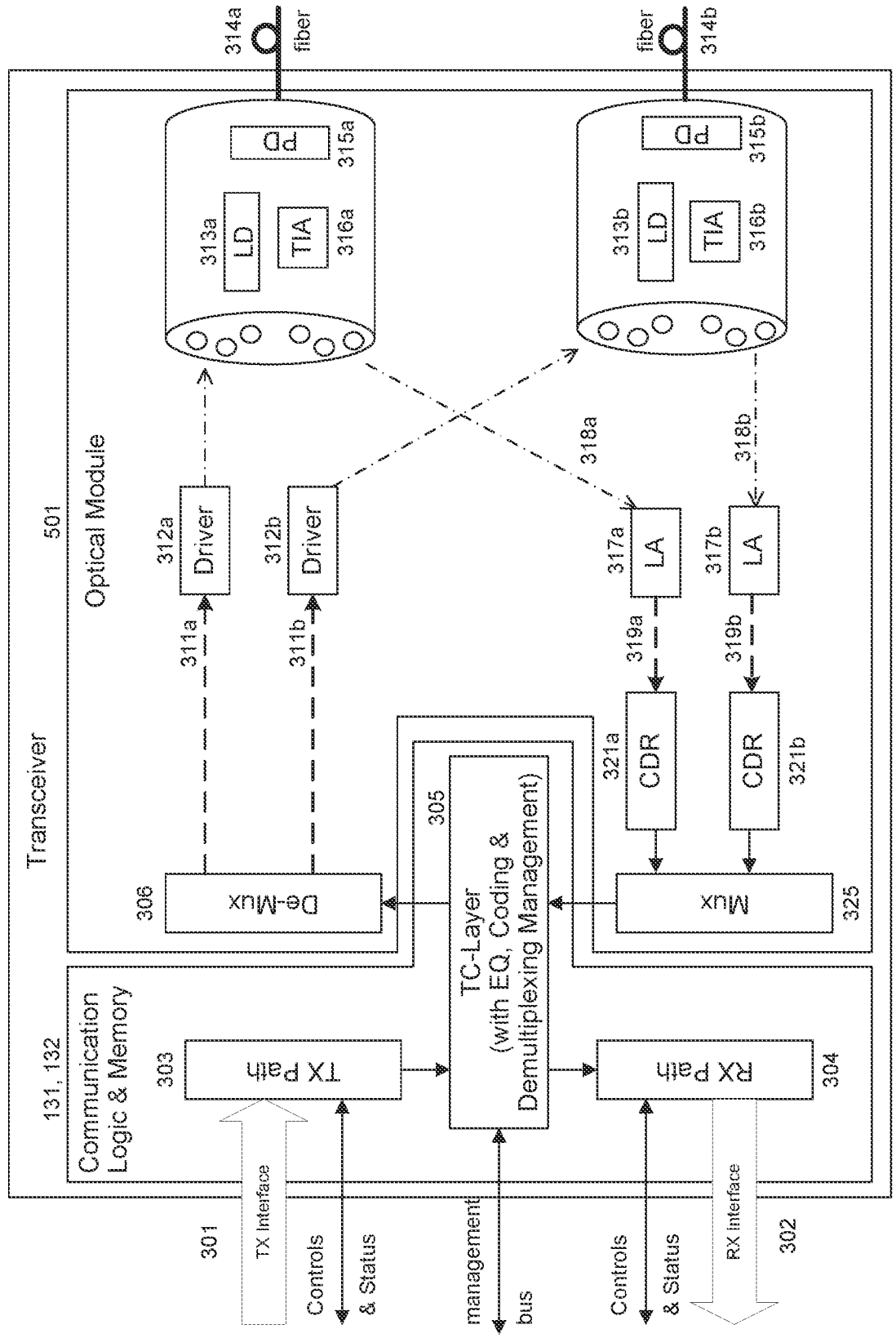
FIG. 5 illustrates a block diagram of an alternative high-speed communication system for fiber optic networks.

Alternatively, in other implementations of transceiver 100, functions described above may be integrated into various different components. For example, in the implementation of transceiver 100 shown in FIG. 4, various functions may be incorporated into optical module 401 such as: digital to analog conversion 310a, 310b; analog to digital conversion 321a, 321b; clock data recovery and equalization 320a, 320b; m-ary modulation 309a, 309b; m-ary de-modulation 323a, 323b; inner coder 308a, 308b; inner de-coder 323a, 323b; outer coder 307a, 307b; outer de-coder 324a, 324b, and the De-Mux 306 and Mux 325 functions that enable demultiplexing across multiple fibers. The optical module 401 may have an interface that can connect to existing TC-Layer or MAC implementations currently produced. In another alternative implementation the digital to analog conversion 310a, 310b; analog to digital conversion 321a, 321b, and the clock data recovery 320a, 320b functions are incorporated into an optical module (not shown). In yet another alternative implementation of the transceiver 100 as shown in FIG. 5, an optical module 501 includes the De-Mux 306 and Mux 325 functions enabling demultiplexing across multiple fibers. The optical module 501 may have an interface that can connect to existing TC-Layer or MAC implementations currently produced.

Figure 6A:
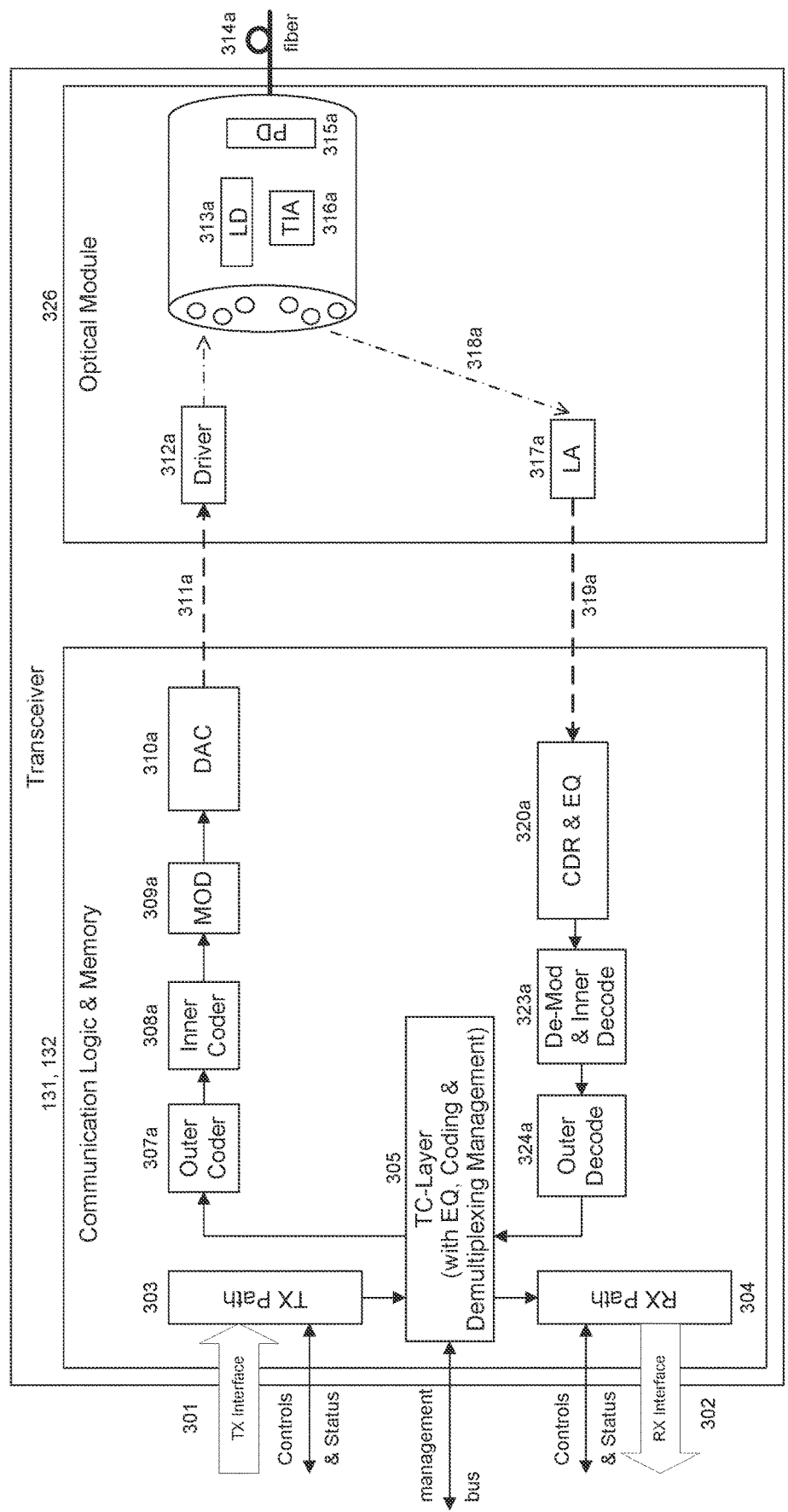
FIG. 6A illustrates a block diagram of an alternative high-speed communication system for fiber optic networks.
Figure 6B:
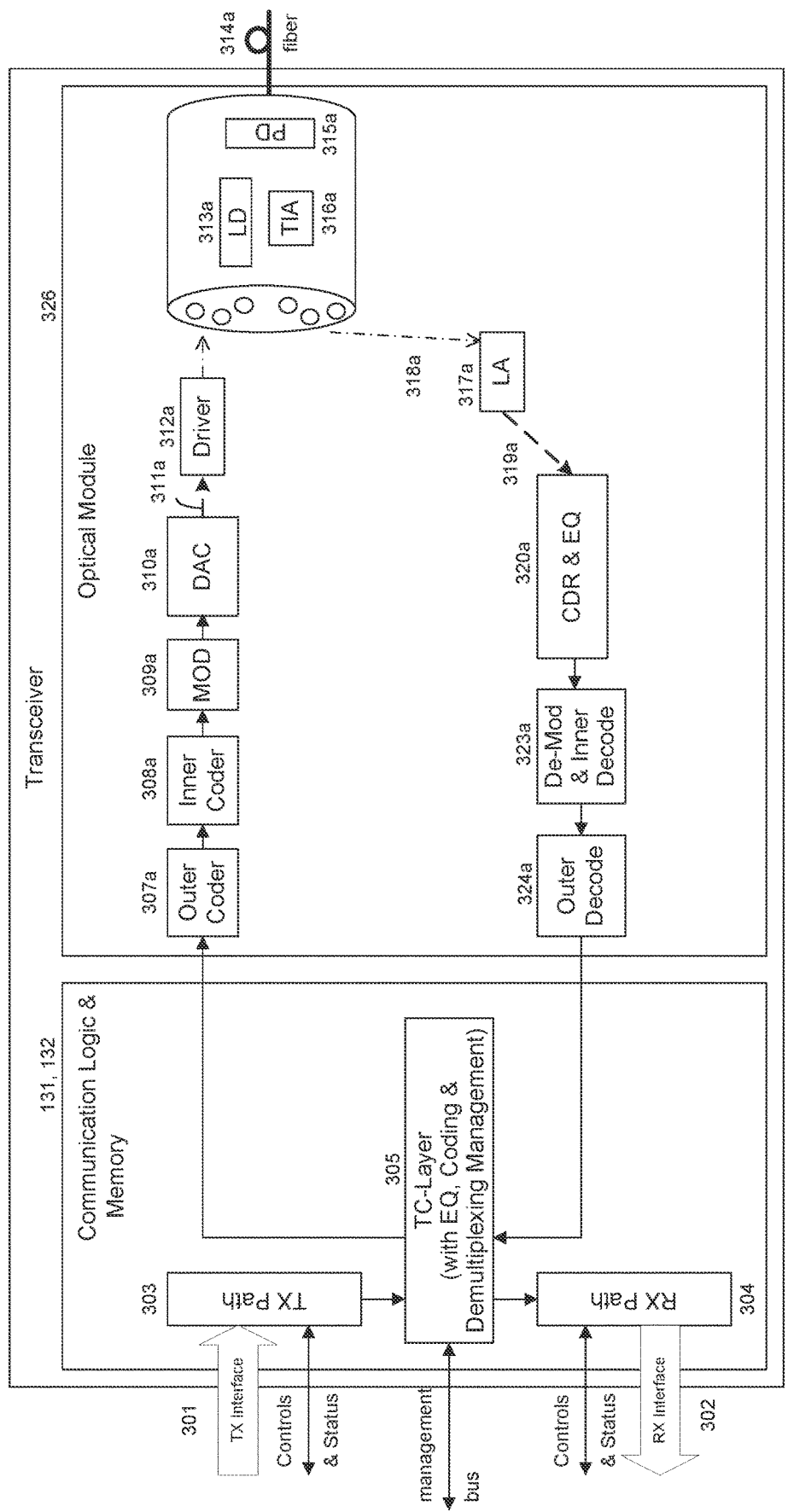
FIG. 6B illustrates a block diagram of an alternative high-speed communication system for fiber optic networks.
Figure 7:
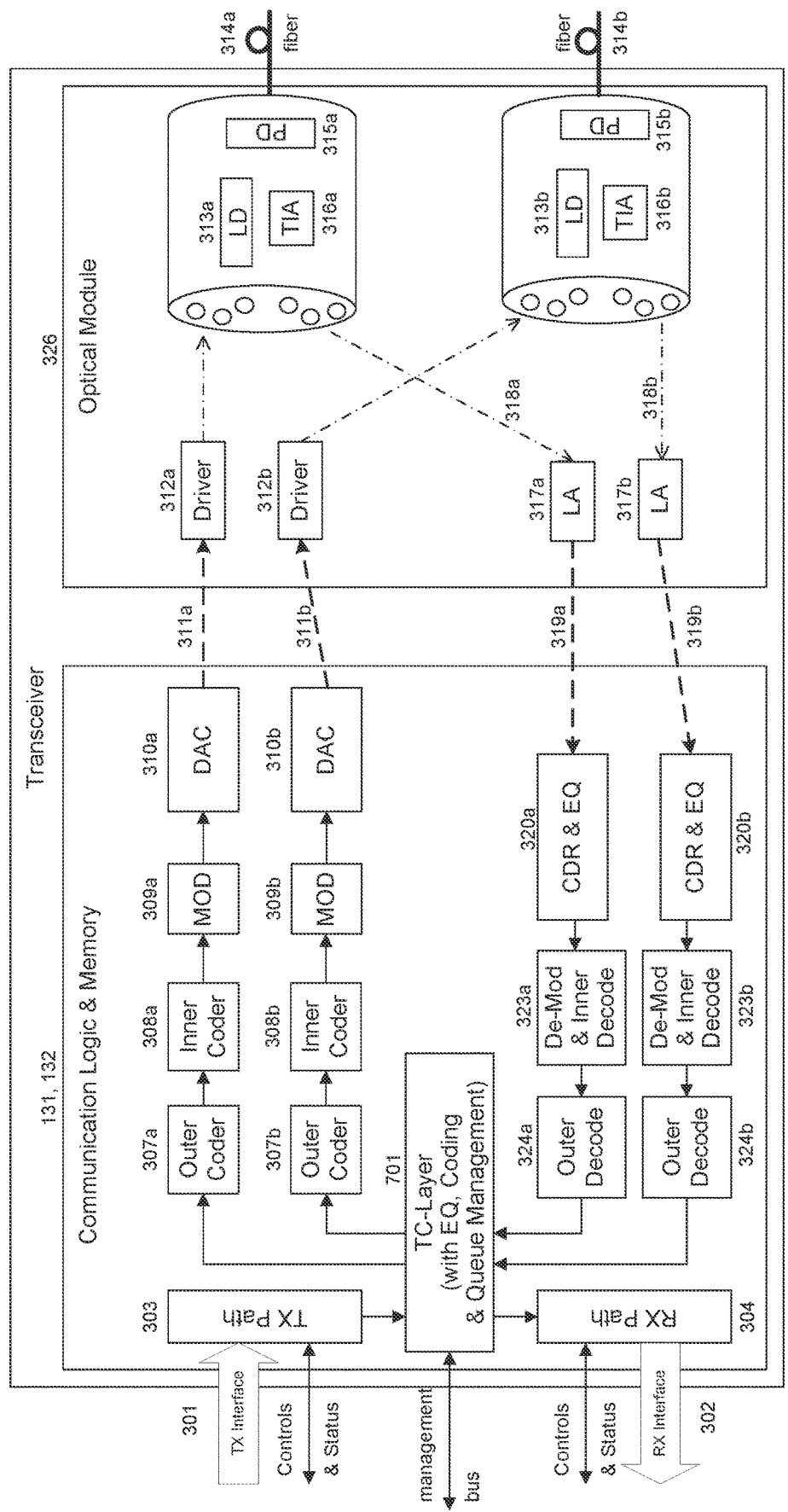
FIG. 7 illustrates a block diagram of an alternative high-speed communication system for fiber optic networks.

Alternative implementations of transceiver 100 utilizing a single fiber link 314a (without demultiplexing across multiple fibers) are illustrated in FIG. 6A-6B. Alternatively, an implementation of the transceiver 100 may utilize multiple fiber links 314a, 314b while not performing demultiplexing across multiple fibers, as illustrated in FIG. 7. In this implementation, the TC-Layer/MAC 701 block manages the fiber links as independent fiber links that all connect to the same end point(s) on the network. In one implementation, TC-Layer/MAC 701 block is a derivative of the Transmission Convergence Layer specified in ITU G.984 or MAC specified in IEEE 802.3ah, with the added functionality of queue management of the traffic across the plurality of independent fiber links. The TC-Layer/MAC 701 block may exclude use of one or more fiber links if the fiber link experiences a failure. This exclusion of failed fiber links enables the TC-Layer/MAC 701 block (i.e., queue management function) to continue providing service across a PON using the remaining active links. Each fiber can be deployed across physically different paths to provide optical fiber distribution path diversity and improved protection against failures. Failures may originate in the optical module or across elements of the ODN such as fiber or connector breaks.

Channel Equalization

An implementation for a channel equalization routine executed in the CDR & EQ 320a, 320b block includes determining coefficient settings or weights that are applied to the received data to remove undesired information (e.g. intersymbol interference (ISI)) or noise from the received data and thereby increase the sensitivity, dynamic range of detecting signals and accuracy of receiving signals. Channel equalization can include a training or convergence period in which characteristics of the channel are learned or accounted for and coefficients, filter variables, or weights are adapted before or while processing the received data. Decision-directed equalization is an equalization method in which a known training sequence is sent during the training period and the receiver/transceiver uses the knowledge of the training sequence to learn about the channel characteristics. The training sequence can be multiplexed within a PON's TC-Layer framing protocol. Blind equalization is a process during which an unknown input data sequence is recovered from the output signal of an unknown channel (i.e., current equalization data for a given channel is unknown or otherwise unavailable). Other equalization methods may be used, digital signal processing methods, or methods that improve the accuracy of processing received data signals or improve the efficiency of processing received data signals (e.g., reducing data acquisition time, reducing power consumed) by saving or storing a first set of settings generated by processing data from a first ONU/ONT and then load previously saved second set of settings previously generated by processing data from a second ONU/ONT before processing another set of data from the second ONU/ONT.

One mode of communications used by a PON, e.g., for upstream data traffic (ONU/ONT to OLT direction), is "burst mode" communications. For example, upstream communications on a PON may include a link shared among multiple clients or ONUs/ONTs via time division multiplexing under control by an OLT. The upstream direction is divided into time slots; each time slot includes a defined number of bits. A given ONU/ONT is granted some number of time slots during which to transmit an upstream frame of data to an OLT. The upstream direction uses an orchestrated collection of bursts from the different ONU/ONTs, coordinated by the OLT that tries to maximize upstream traffic bandwidth efficiency by minimizing empty slots.

Figure 8B:
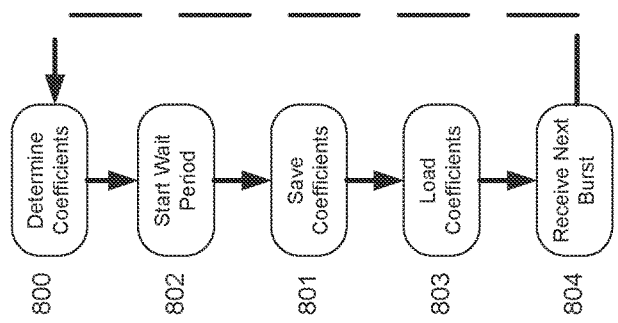
FIG. 8B illustrates another exemplary flow diagram for upstream burst mode communication processing.
Figure 8A:
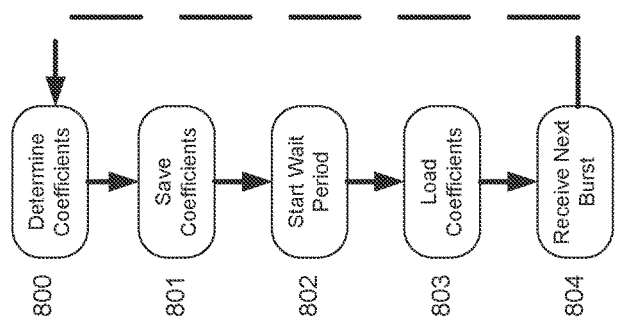
FIG. 8A illustrates an exemplary flow diagram for upstream burst mode communication processing.

A flow chart for an exemplary upstream burst mode communication equalization process is shown in FIG. 8A. To read or interpret the upstream data traffic from a client ONU/ONT, an OLT trains and/or equalizes the channel for that client ONU/ONT. Since the ONU/ONTs may be at different distances from the OLT and all do not share the same fiber, different channel characteristics result. Communication efficiencies may be obtained by determining 800 a set of equalization coefficients for a channel during a burst from a client, saving 801 the determined equalization coefficients, entering a wait period 802 (also known as a PON's silence period when no client ONU/ONTs are transmitting upstream), and loading 803 the stored equalization coefficients before a next burst from the client (during the wait period), to avoid re-training or re-equalizing on every burst communication. The OLT has prior knowledge of which ONU/ONT will be transmitting data during which time slots and can use this knowledge during the time between burst communications (during the wait period) to load 803 an appropriate set of coefficients pertaining to the particular ONU/ONT transmitting prior to receiving 804 its next upstream burst. This process continues for subsequent bursts. In one implementation, periodic (though not coincident with each communication burst) updates to the channel characteristics may be made (and stored). The OLT can save 801 coefficients that have converged or have been trained after receiving burst communications from the first ONU/ONT and load 803 a new set of coefficients during the wait period between bursts (i.e., before an incoming upstream burst from a second ONU/ONT). In another exemplary implementation, the OLT can save or store 801 coefficients or settings during the wait period 802 between burst as shown in FIG. 8B. In one implementation, in addition to or alternative to storage of coefficient data, the OLT may also save and load inner and/or outer coding states between bursts improving the efficiency of communication, similar to the equalization process of FIG. 8A-8B. Other methods that improve the accuracy and efficiency of processing burst mode data from specific ONUs/ONTs may be used following a similar process.

Another mode of communications used by a PON, e.g., for downstream data traffic (OLT to ONU/ONT direction), is "continuous mode" communications. In one implementation, a receiver, such as an ONU/ONT, equalizes a received data channel using either one of a blind equalization or a decision directed equalization method.

Figure 9:
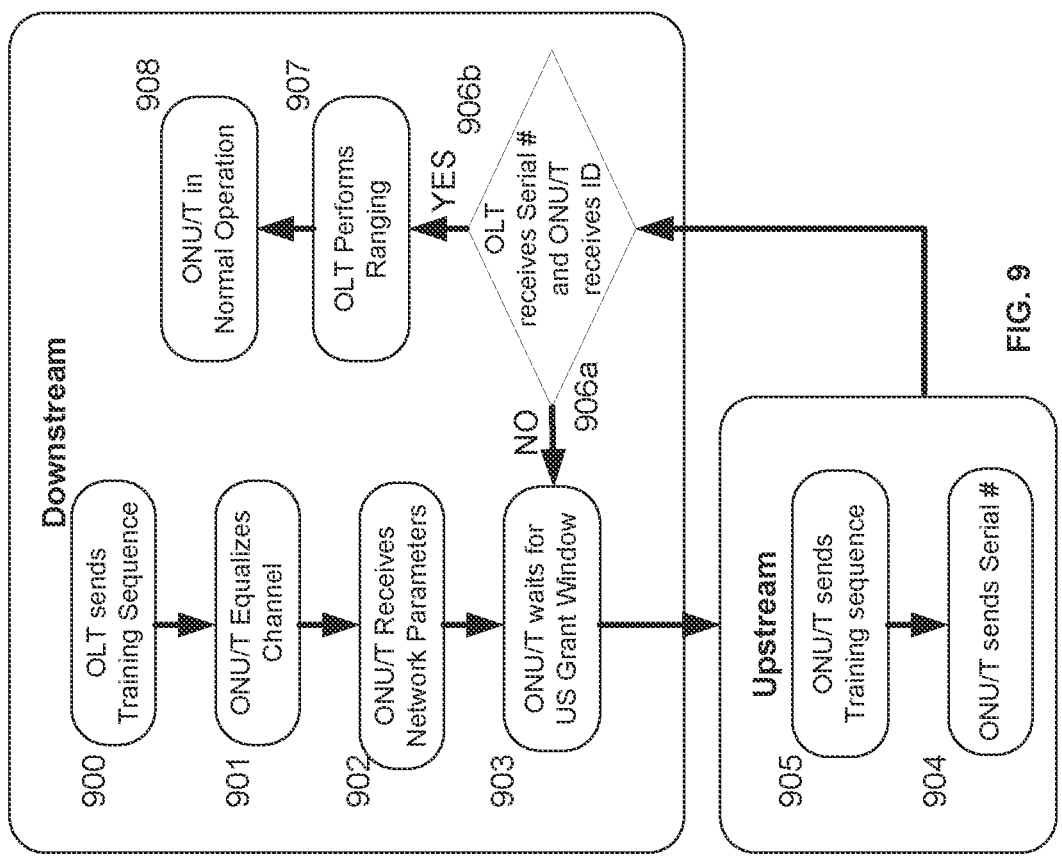
FIG. 9 illustrates an exemplary flow diagram for a downstream continuous mode communication equalization process.

A flow chart for an exemplary PON activation process is shown in FIG. 9. In a PON in which a decision directed method is used for training an ONU/ONT receiver, a continuous mode transmitter, such as an OLT transmitter, sends a training sequence 900 multiplexed within a PON's TC-Layer downstream frame protocol. In a PON in which a blind equalization method is used, the OLT needed not send this training sequence 900. An ONU/ONT equalizes its received downstream channel 901 before it is able to receive and interpret PON network parameters 902. If the OLT has not been previously informed of the existence of the ONU/ONT then the ONU/ONT awaits an upstream grant window 903 available for new ONU/ONTs to respond to the OLT with its serial number 904. After the ONU/ONT has received an upstream grant window and processed PON system parameters, the ONU/ONT sends a training sequence 905 and then its serial number 904 to the OLT. In a PON in which blind equalization is used the ONU/ONT need not send a training sequence 905. After the OLT has received the ONU/ONT serial number the OLT will assign and send the ONU/ONT an identification number. If the ONU/ONT does not receive an identification number 906a, the ONU/ONT returns to waiting for an upstream grant window for new ONU/ONTs 903. Once the ONU/ONT receives an identification number 906b, the OLT performs ranging 907 to determine the distance between the OLT and ONU/ONT and then compensates for the communication timing delays. The ONU/ONT can perform updates continuously or periodically depending on the equalization method employed. After the downstream continuous mode channel and the upstream burst mode channel have been equalized, both ends of the PON transmission link are equalized and the ONU/ONT enters its normal operating state 908.

Link Connection Errors

A system has been proposed that includes demultiplexing across multiple fibers as is shown above with reference to FIGS. 3-6. In systems using demultiplexing across multiple fibers, fibers can be connected incorrectly at installation. For example, a first transceiver 100, such as is shown in FIG. 3, with fibers 314a and 314b can be connected to a second transceiver 101 with fiber 314b connected in place of fiber 314a, and fiber 314a connected in place of fiber 314b. The incorrect connection in this example may cause the first and second transceivers to not establish communications due to misalignment of bits during multiplexing of received data.

Information in a frame is used to synchronize a receiver (e.g., transceiver 101) with the beginning of a frame (e.g., a "frame delimiter"). The process of discovering the beginning of a frame is called "frame synchronization." In specific protocols such as G.984, the downstream frame delimiter is called Psync, the upstream frame delimiter is called Delimiter and the process of frame synchronization in the downstream is called the HUNT. In one implementation, TC-Layer/MAC 305 block performs frame synchronization. In one implementation, specific bit patterns or values for frame delimiters are used that are unique for each fiber to differentiate one fiber from another or the order of fiber connections to correctly multiplex received data. The use of unique frame delimiters allows the TC-Layer/MAC 305 block to change the alignment of received data bits during multiplexing to adjust for the order of the fiber connections, without having to physically change the connections. Management of the bit alignment in this implementation forms part of the TC-Layer/MAC's 305 block demultiplexing management responsibilities and functions.

Alternatively, the TC-Layer/MAC 305 block may assume an order for the fiber connections to determine the alignment of bits for multiplexing the received data and attempt frame synchronization. After a period of time with no frame synchronization success, the TC-Layer/MAC 305 block may assume a different order for the fiber connections and change the alignment of bits during multiplexing and attempt frame synchronization again. The process may repeat, including changing the alignment of bits to reflect other configurations during the multiplexing, and frame synchronization attempts continue until frame synchronization succeeds. In yet another alternative implementation, the TC-Layer/MAC 305 block may assume and attempt frame synchronization on all possible combinations of bit alignments in parallel, one of which will succeed in achieving frame synchronization.

Figure 10:
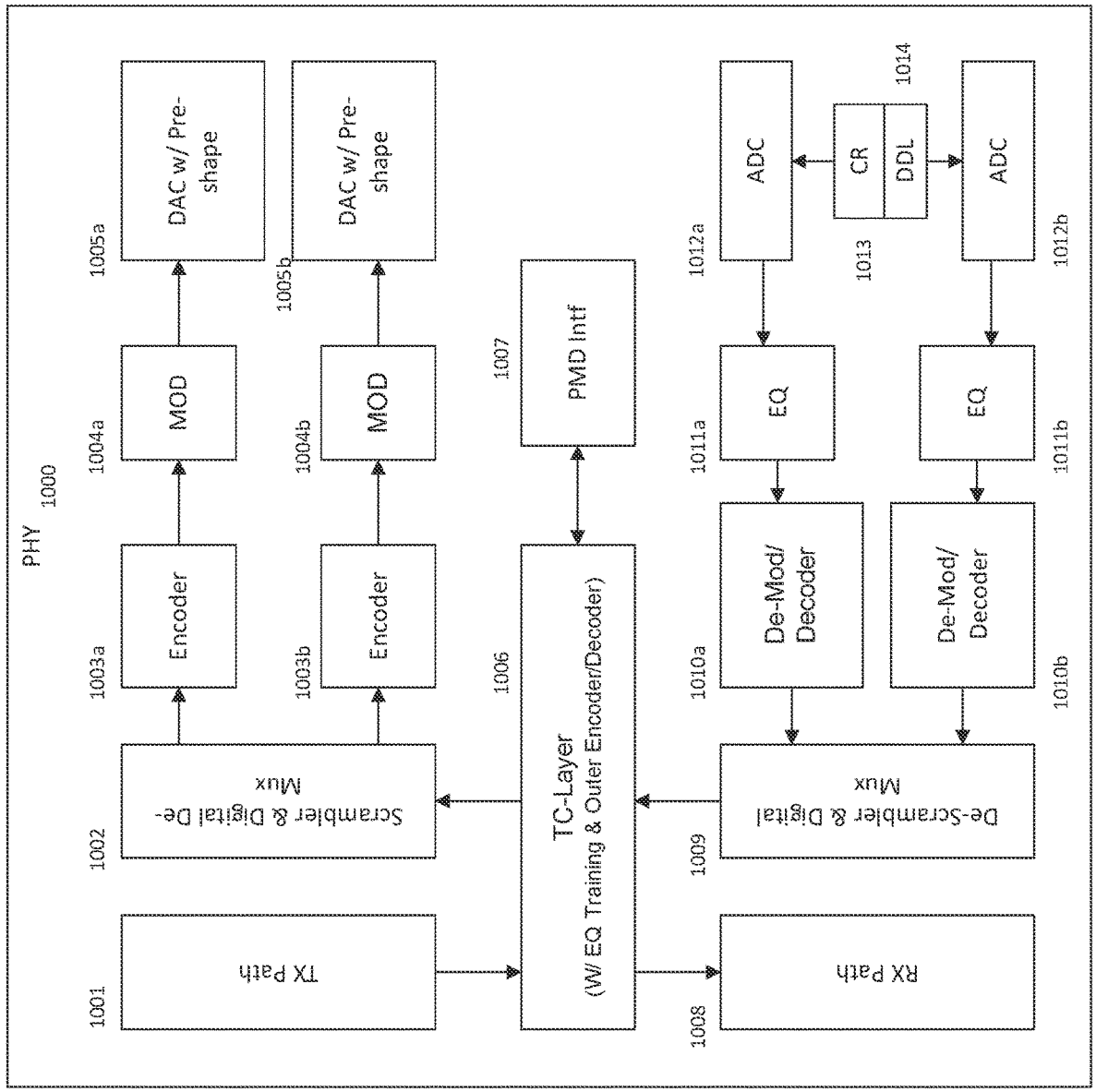
FIG. 10 is a block diagram of a combined Physical Medium Attachment (PMA) and Physical Coding Sublayer (PCS) device according to an exemplary embodiment of the invention.

FIG. 10 is a block diagram of a combined Physical Medium Attachment (PMA) and Physical Coding Sublayer (PCS) device 1000 according to an exemplary embodiment of the invention. The preferred exemplary embodiment would employ an asynchronous or synchronous interface that is represented by the TX Path 1001 and RX Path 1008 blocks. These blocks would manage the PMA/PCS interface that feed data into 1001 and get data from 1008 the TC-Layer block 1006. The Transmission Convergence Layer (TC-Layer) 1006 block is crucial for a PON. The TC-layer is responsible to create the transport system that user traffic will exploit. The need for a TC-Layer arises in PONs because of its tree-based topology in a physical layer that must be hidden from higher layers where layer 2 bridging functions are performed. The TC-Layer could, for design performance of the embodiment, perform the additional functions of an Equalizer state machine and an outer encoder and outer decoder. The TC-Layer 1006 would send outgoing data to the Scrambler and Digital DEMUX block 1002. The purpose of the scrambler 1002 would be to randomize the data for possible improvement of the transmission. The purpose of the Digital DEMUX 1002 would be to split into a plurality the transmitting data streams that would maintain the aggregated data rate equivalent to the input to the Digital DEMUX 1002. As mentioned previously the envisioned embodiment would have two transmit and receive paths. The advantage in splitting transmit and receive paths is that the bit clock rates are reduced at the cost of an additional fibers. Reducing the bit clock on fiber has the effect of improving optical loss budget thereby increasing reach and/or number of clients in a point-to-multipoint PON network. Again embodiments of the invention need not split transmit and receive paths. After digital DEMUX, the two transmit paths have analogous processing blocks. In order to improve the energy per bit required to deliver the transmitting data an encoding method is employed and is represented by blocks 1003a & 1003b. If the TC-Layer 1006 employs an outer encoder/decoder then the encoding method of 1003a & 1003b would be an inner encoding method and the system would be enabling forward error correction (FEC) recovery of bit errors. To improve communications performance by enabling the transmitted signals to better withstand the effects of various channel impairments and to increase the number of bits per symbol transmitted by the invention, the Modulation (MOD) 1004a & 1004b is performed. Following MOD the transmitting data would be converted to an analog signal by a Digital to Analog Converter (DAC) 1005a and 1005b that would include ability to shape the signal for improved transmission performance. On the path of reception of data, the data would be received as an analog signal therefore an Analog to Digital Converter (ADC) 1012a & 1012b would be needed. To aid the ADC, a Clock Recovery (CR) 1013 device is needed that is capable of recovering the clock of m-ary data. A second CR is not needed because a Digital Delay Loop (DDL) 1014 can be used to aid the other ADC 1012b. Note that a PON system is assumed to have a closed clock loop where the OLTs transmit clock is used to synchronize the entire PON system, which implies that PON client's recovered receive clock is used for the upstream transmit transmission. Following the ADCs 1012a & 1012b, the received data is processed through an Equalization method 1011a & 1011b to remove unwanted noise added by various channel impairments. After equalization the received data would be sent into a De-Modulation/Decoder 1010a & 1010b block to demodulate and decode the received data. Next, the received data is descrambled and MUXed back together before being feed into the TC-Layer 1006 by the De-Scrambler and Digital MUX 1009 block.

Figure 11:
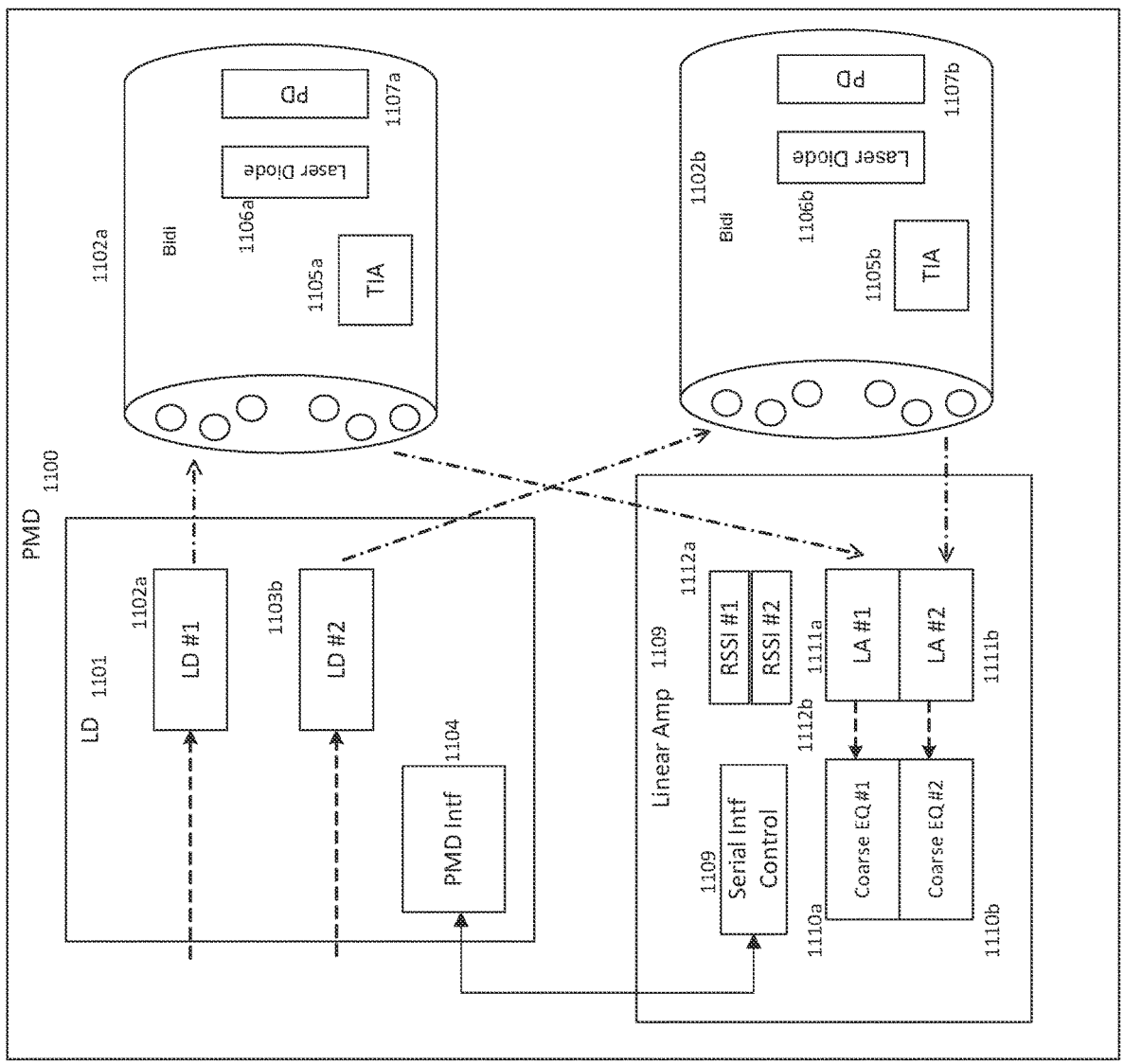
FIG. 11 is a block diagram of a Physical Medium Dependent (PMD) device according to an exemplary embodiment of the invention.

FIG. 11 is a block diagram of a Physical Medium Dependent (PMD) device according to an exemplary embodiment of the invention. The inputs and outputs of the PMD are analog signals. As discuss before, the preferred embodiment would have two transmit and receive paths hence there would be two Laser Drivers 1103a & 1103b; two Bidirectional optical sub-assemblies often referred to as simply Bidi 1102a & 1102b; and two Linear Amplifiers 1111a & 1111b. The Bidis would employ at a minimum a Transimpedance Amplifier (TIA) 1105a & 1105b, a Laser Diode 1106a & 1106b and a Photo Diode 1107a & 1107b. The PMD 1100 could employ a coarse equalization method 1110a & 1110b and a Receive Sensitivity Signal Interface (RSSI) that reports the measured received power. The preferred embodiment would have a serial interface (PMD intf.) 1104 to enable control 1109 of the coarse equalization 1110a & 1110b and the RSII1 1112a and RSII2 1112b.

Figure 12:
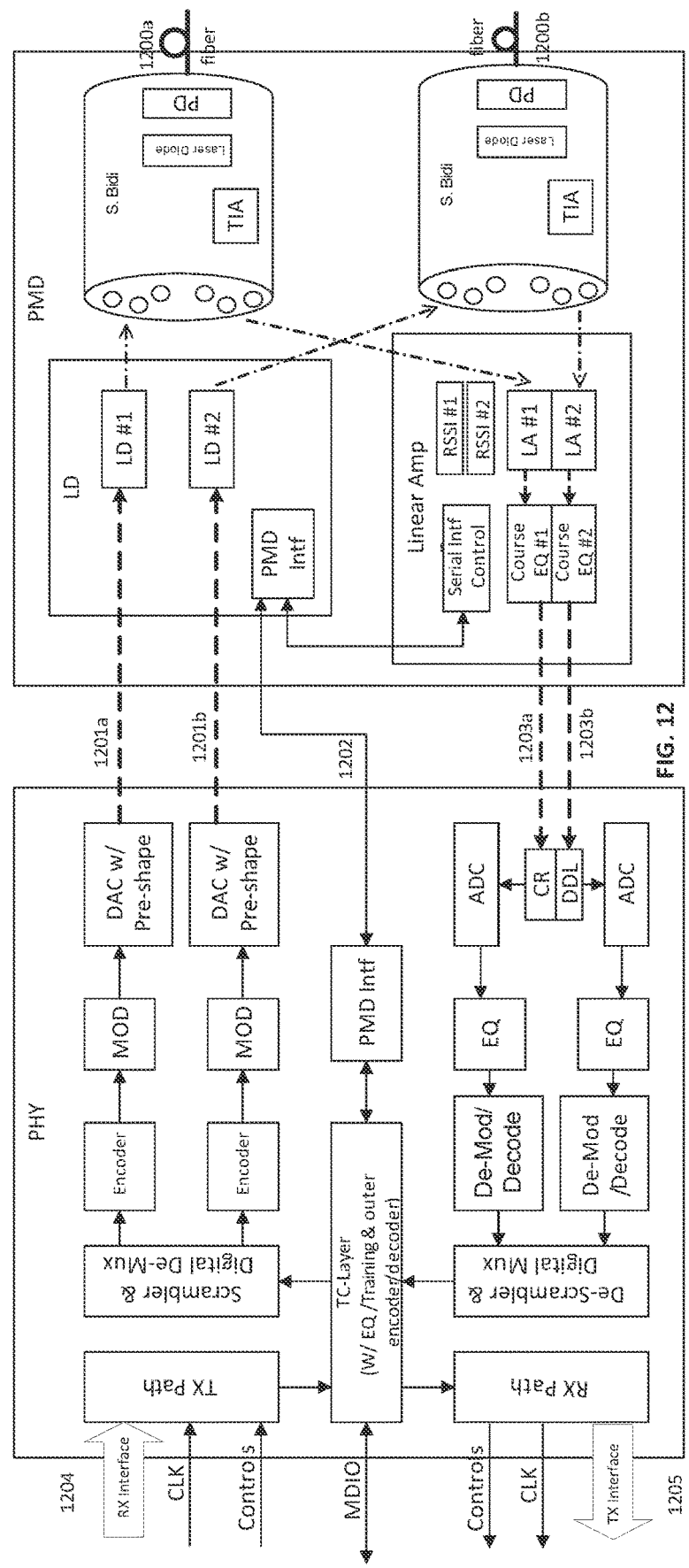
FIG. 12 is a block diagram of a combined PMA/PCS and PMD device called a PHY according to an embodiment of the invention.

FIG. 12 is a block diagram of a combined PMNPCS and PMD device called a PHY according to an embodiment of the invention. FIG. 12 shows the two fibers 1200a & 1200b as envisioned in the preferred embodiment. The fibers would have particular wavelength for the transmit path and a particular wavelength for the receive path. The PMA/PCS and PMD devices are connected with analog signals capable of very high data rates; 1201a & 1201b; 1203a and 1203b. The serial interface is connected between them 1202 and FIG. 12 shows the asynchronous or synchronous interface 1204 and 1205.

Figure 13:
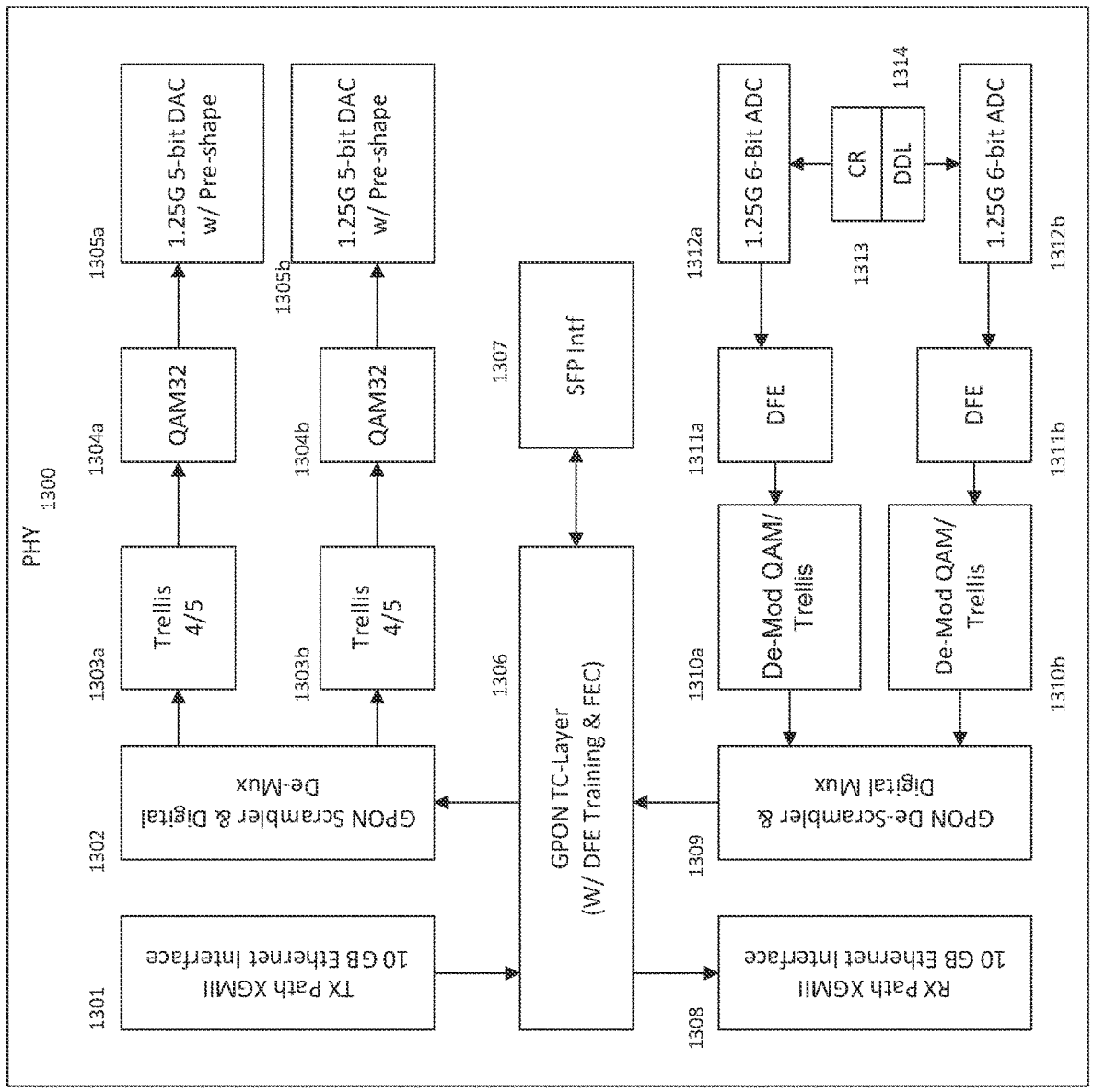
FIG. 13 is a block diagram of an example PMA/PCS device according to an exemplary embodiment of the invention.

FIG. 13 is a block diagram of an example PMA/PCS device according to an exemplary embodiment of the invention. In the example, a specific implementation of the embodiment of the invention is discussed. The example is designed to implement a 10 Gbit/sec PON. For the asynchronous or synchronous interface the asynchronous XGMII interface 1301 & 1308 is chosen. GPON, a current PON standard from the I.T.U. used for 2.5 Gbps and below data rates, is chosen for the TC-Layer implementation 1306 with the addition of equalization training control and a reed-solomon encoder/decoder. GPON has its own defined Scrambler and De-scrambler method and would be implemented with the Digital MUX and DEMUX, blocks 1302 & 1309. For the encoding method, a 4/5 trellis method 1303a & 1303b is selected along with QAM-32 for the modulation 1304a & 1304b. With a 10 Gbit/sec PON using QAM-32 modulation on dual fibers leaves a 1.25G Symbol/sec as the symbol rate of the transmitted carrier. Therefore a 1.25 GHz 5-bit DAC 1305a & 1305b with a corresponding 1.25G 6-bit ADC 1312a & 1312b are needed. The CR 1313 and DDL 1314 would be designed appropriately to handle the 1.25G Symbol/sec rates. Similarly, if the 10G user data rate PON were to be enabled via 12.5G 88/108 XAUI interface, a 12.5 Gbit/sec implementation would translate into a 1.56G symbol/sec modulation rate. The equalization method selected is a Decision Feedback Equalization 1311a & 1311b or possibly a blind equalization method. De-modulation and Viterbi decoding 1310a & 1310b are selected to complement the example design decisions already made.

Figure 14:
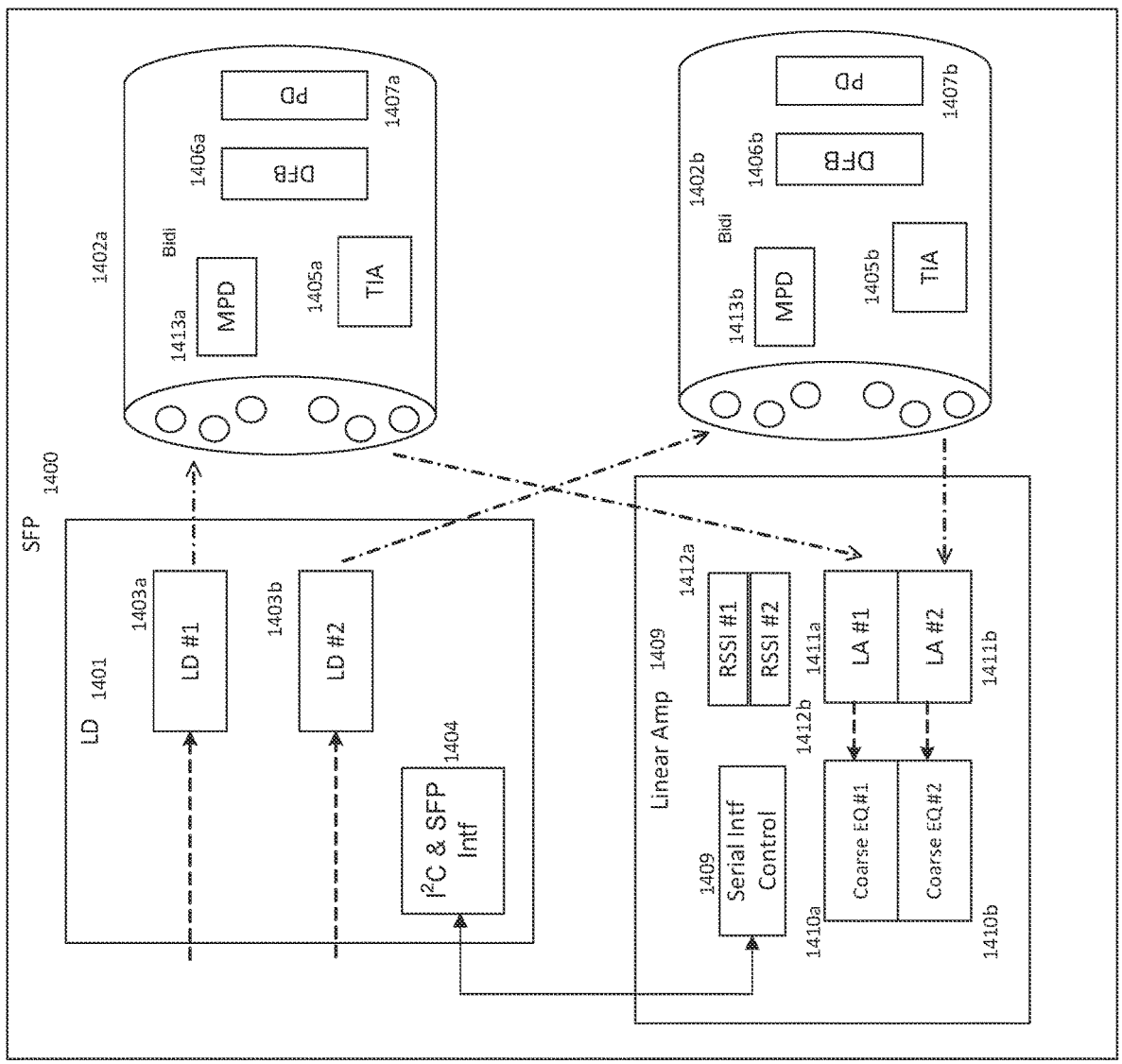
FIG. 14 is a block diagram of an example PMD device according to an exemplary embodiment of the invention.

FIG. 14 is a block diagram of an example PMD device according to an exemplary embodiment of the invention. The example PMD device would comply with the Small Form-factor Pluggable (SFP) 1400 specification. This specification has constraints on all physical aspects such as package size and pins. The SFP 1400 would contain the necessary; LDs 1403a & 1403b; LAs 1411a & 1411b; TIAs 1405a & 1405b; RSSIs 1412a & 1412b; Coarse EQs 1410a & 1410b; and PDs 1407a & 1407b. The SFP 1400 would use Distributed Feedback (DFB) edge emitter laser diodes 1406a & 1406b and a Monitor Photo Diode (MPD) 1413a & 1413b. The SFP would have an I2C bus interface 1404 that would allow control by the PMA/PCS device of the Coarse EQs 1410a & 1410b, RSSIs 1412a & 1412b and MPD.

Figure 15:
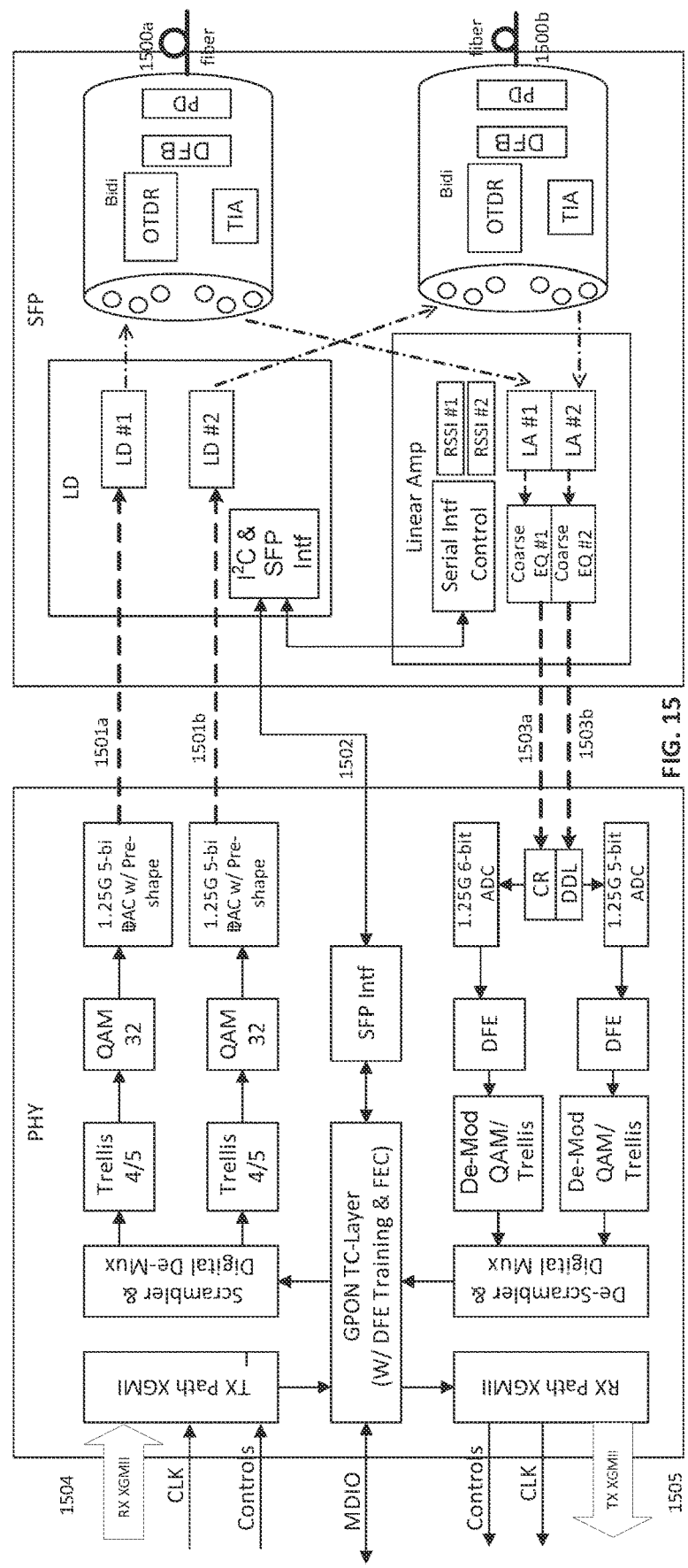
FIG. 15 is a block diagram of an example PHY device according to an exemplary embodiment of the invention.

FIG. 15 is a block diagram of an example PHY device according to an exemplary embodiment of the invention. The PMA/PCS and PMD are connected through high-speed analog lines 1501a, 1501b & 1503a, 1503b, as well as the I2C bus 1502. XGMII 1504 & 1505 connections for the PMA/PCS are shown as well.

Although the invention has been described in terms of particular implementations, one of ordinary skill in the art, in light of this teaching, can generate additional implementations and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of operation for a pluggable optical transceiver module comprising of:
  receiving a first electrical analog data signal through a first electrical system interface of the pluggable optical transceiver module;
  amplifying the first electrical analog data signal to drive an optical transmitter in the pluggable optical transceiver module;
  emitting a first optical signal responsive to and representative of the amplified first electrical analog data signal from the optical transmitter in the pluggable optical transceiver module;
  receiving a second optical signal and producing a first received electrical analog data signal responsive to and representative of the second optical signal from an optical detector in the pluggable optical transceiver module;
  amplifying the first received electrical analog data signal to produce a second electrical analog data signal from an amplifier in the pluggable optical transceiver module;
  transmitting the second electrical analog data signal through the first electrical system interface of the pluggable optical transceiver module; and
  receiving information to control equalization of data signals in the pluggable optical transceiver module through a second electrical system interface of the pluggable optical transceiver module.

2. The method of claim 1, wherein the form factor of the pluggable optical transceiver module is a pluggable form factor standard.

3. The method of claim 2, wherein the form factor standard is a small form factor pluggable (SFP) or SFP+ form factor standard.

4. The method of claim 2, wherein the form factor standard is an XFP form factor standard.

5. The method of claim 1, wherein the second electrical system interface is a serial interface.

6. The method of claim 1, wherein the second electrical system interface is used to control, adjust or modify coarse equalization of data signals in the pluggable optical transceiver module.

7. The method of claim 1, wherein the first electrical system interface includes parallel signals.

8. The method of claim 1, wherein the first electrical system interface includes serial signals.

9. The method of claim 1, wherein the first electrical data signal and second electrical data signal includes parallel electrical data signals.

10. The method of claim 1, wherein the first electrical system interface includes an attachment unit interface (AUI) based interface.

11. The method of claim 1, wherein the first optical signal is emitted on a first wavelength.

12. The method of claim 1, wherein the second optical signal is received on a second wavelength.

13. The method of claim 1, wherein the amplifier includes a transimpedance amplifier (TIA).

14. The method of claim 1, wherein the amplifier includes a linear amplifier.

15. The method of claim 1, wherein the amplifier performs equalization to produce the second electrical analog data signal.

16. The method of claim 1, wherein the received electrical analog data signal is amplified and then equalized in the amplifier to produce the second electrical analog data signal.

17. The method of claim 16, wherein the equalization is controlled through the second electrical system interface.

18. The method of claim 1, wherein the method further includes:
  receiving a third optical signal and producing a second received electrical analog data signal responsive to and representative of the third optical signal from a second optical detector in the pluggable optical transceiver module;
  amplifying the second received electrical analog data signal to produce a third electrical analog data signal from a second amplifier in the pluggable optical transceiver module; and
  transmitting the third electrical analog data signal through the first electrical system interface of the pluggable optical transceiver module.

19. The method of claim 18, wherein the second received electrical analog data signal is amplified and then equalized in the second amplifier to produce the third electrical analog data signal.

20. The method of claim 19, wherein the equalization is controlled through the second electrical system interface.

* * * * *